United States Patent
Malipatil et al.

(10) Patent No.: US 8,472,513 B2
(45) Date of Patent: Jun. 25, 2013

(54) TX BACK CHANNEL ADAPTATION ALGORITHM

(75) Inventors: Amaresh Malipatil, Milpitas, CA (US); Lizhi Zhong, Sunnyvale, CA (US); Wenyi Jin, Sunnyvale, CA (US); Ye Liu, San Jose, CA (US)

(73) Assignee: LSI Corporation, San Jose, CA (US)

( * ) Notice: Subject to any disclaimer, the term of this patent is extended or adjusted under 35 U.S.C. 154(b) by 1055 days.

(21) Appl. No.: 12/353,860

(22) Filed: Jan. 14, 2009

(65) Prior Publication Data

US 2010/0177816 A1    Jul. 15, 2010

(51) Int. Cl.
*H04B 3/46* (2006.01)

(52) U.S. Cl.
USPC ............................. 375/233; 375/219; 375/229

(58) Field of Classification Search
USPC ................. 375/229, 230, 231, 232, 233, 295, 375/340, 353, 241, 350; 360/65
See application file for complete search history.

(56) References Cited

U.S. PATENT DOCUMENTS

| | | | | |
|---|---|---|---|---|
| 5,315,619 | A * | 5/1994 | Bhatt ............................. | 375/340 |
| 6,240,132 | B1 * | 5/2001 | Yedid ............................ | 375/232 |
| 6,240,133 | B1 * | 5/2001 | Sommer et al. ............... | 375/232 |
| 6,400,761 | B1 * | 6/2002 | Smee et al. .................... | 375/232 |
| 7,190,744 | B2 * | 3/2007 | Xia et al. ....................... | 375/341 |
| 7,257,181 | B2 * | 8/2007 | Jones et al. .................... | 375/350 |
| 7,266,145 | B2 * | 9/2007 | Balasubramonian et al. | 375/229 |
| 7,277,480 | B2 * | 10/2007 | Gorecki ......................... | 375/232 |
| 7,339,988 | B1 * | 3/2008 | Shanbhag et al. ............. | 375/232 |
| 7,940,839 | B2 * | 5/2011 | Lapointe et al. .............. | 375/229 |

(Continued)

OTHER PUBLICATIONS

Lin, L.; Noel, P.; Kwasniewski, T. "A VLSI implementation of an adaptation algorithm for a pre-emphasis in a backplane transceiver", ICCCAS 2004; vol. 2, Jun. 27-29, 2004; pp. 1429-1433.

*Primary Examiner* — Daniel Washburn
*Assistant Examiner* — Fitwi Hailegiorgis
(74) *Attorney, Agent, or Firm* — Christopher P. Whitham; Cochran Freund & Young LLC

(57) ABSTRACT

Disclosed is a method and system that adapts coefficients of taps of a Finite Impulse Response (FIR) filter to increase elimination of Inter-Symbol Interference (ISI) introduced into a digital communications signal due to distortion characteristics caused by a real-world communications channel. In the communications system there is a Finite Impulse Response (FIR) filter. The FIR filter has at least one pre and/or post cursor tap that removes pre and/or post cursor ISI from the signal, respectively. The pre/post cursor taps each have pre/post cursor coefficients, respectively, that adjusts the effect of the pre/post cursor portion of the FIR filter. The FIR filtered signal is transmitted over the channel which distorts the signal due to the changing and/or static distortion characteristics of the channel. The channel distorted signal is received at a receiver that may pass the channel distorted signal through a quantifier/decision system (e.g., a slicer) as the quantifier input signal to quantify the quantifier input signal to one of multiple digital values. The channel distorted signal may be further adjusted by summing the channel distorted signal with the output of a Decision Feedback Equalizer (DFE) filter to create a DFE corrected signal which then becomes the quantifier input signal. An error signal is determined by finding the difference between the scaled quantifier decision and the quantifier input signal. The pre/post cursor coefficient values that adjust the effects of the pre/post cursor taps of the FIR filter are updated as a function of the error signal and at least two quantifier decision values, and update coefficient values, may be sent over a communications backchannel to the FIR filter.

22 Claims, 13 Drawing Sheets

U.S. PATENT DOCUMENTS

| | | | |
|---|---|---|---|
| 2002/0191716 A1* | 12/2002 | Xia et al. | 375/341 |
| 2007/0258517 A1* | 11/2007 | Rollings et al. | 375/233 |
| 2010/0020860 A1* | 1/2010 | Dai et al. | 375/231 |

* cited by examiner

100 BASIC COMMUNICATION SYSTEM DIAGRAM

200 CHANNEL FREQUENCY RESPONSE GRAPH SHOWING LOW-PASS FILTERING EFFECT

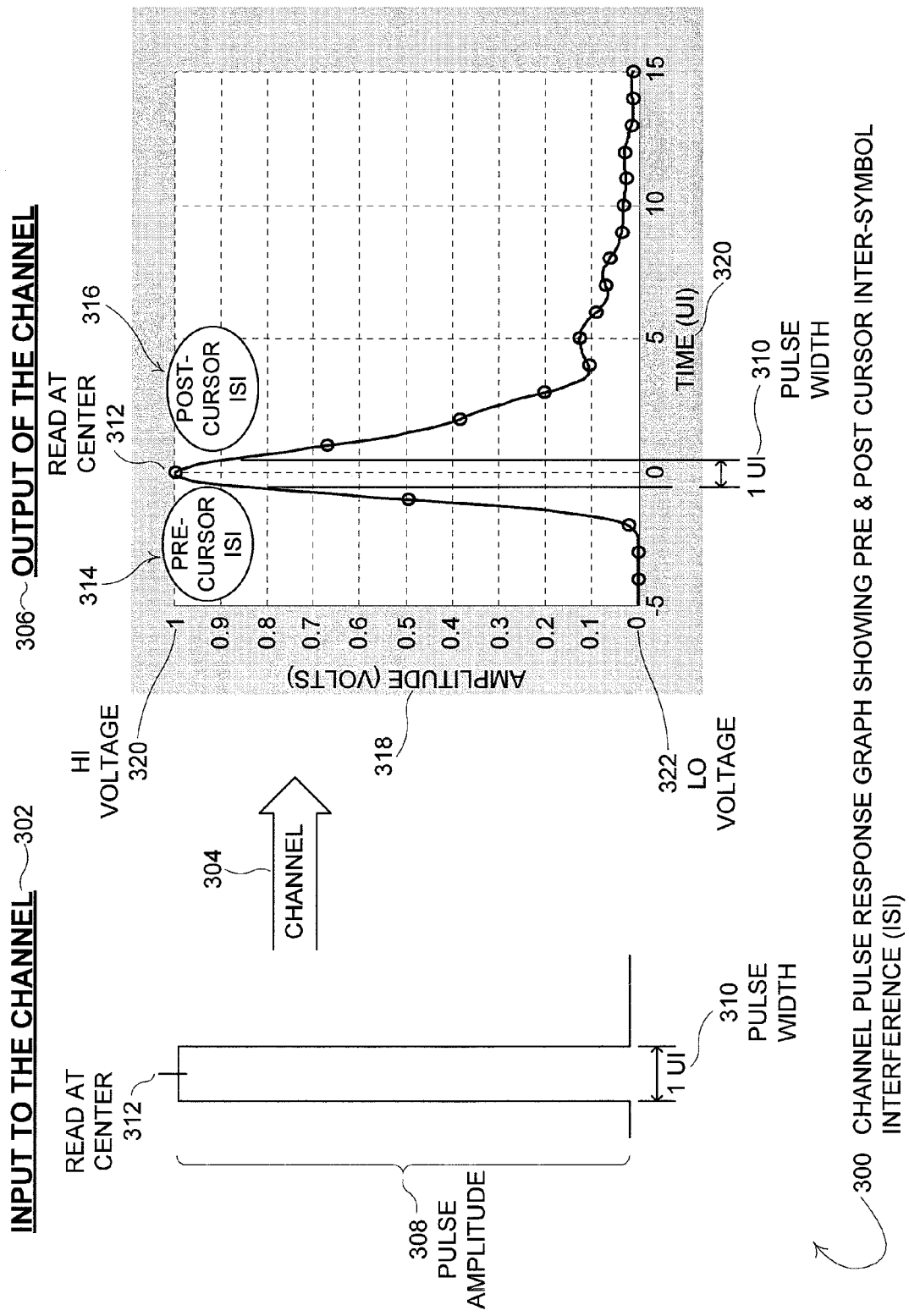

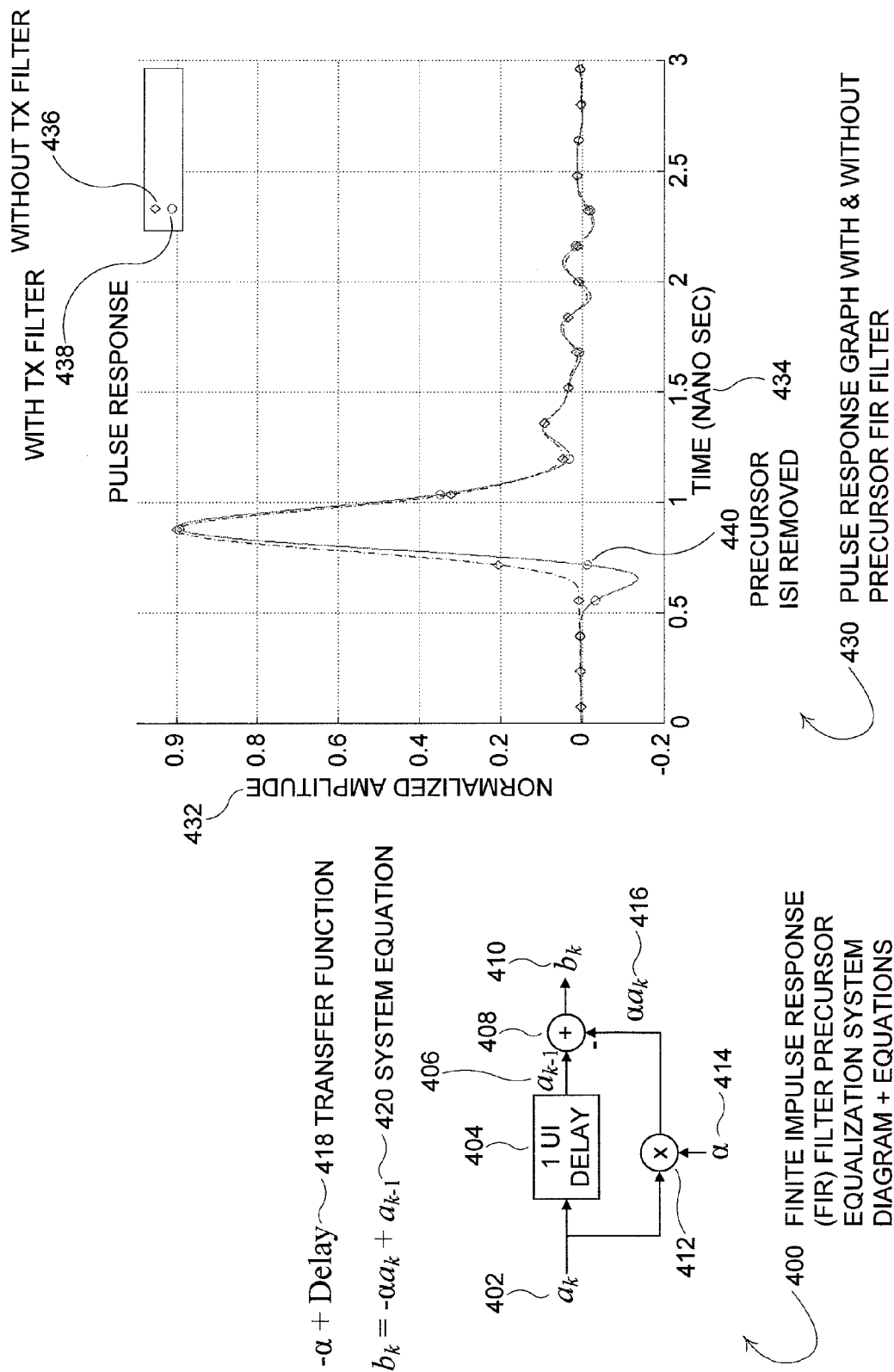
FIG. 4B 430 PULSE RESPONSE GRAPH WITH & WITHOUT PRECURSOR FIR FILTER
FIG. 4A 400 FINITE IMPULSE RESPONSE (FIR) FILTER PRECURSOR EQUALIZATION SYSTEM DIAGRAM + EQUATIONS
$-\alpha$ + Delay ~ 418 TRANSFER FUNCTION
$b_k = -\alpha a_k + a_{k-1}$ ~ 420 SYSTEM EQUATION

800 MID-LEVEL DETAIL COMMUNICATION SYSTEM DIAGRAM

TX BACK CHANNEL ADAPTATION ALGORITHM

BACKGROUND OF THE INVENTION

A digital communications system sends data bits from one location, a transmitting location, to another location, a receiving location. Typically a digital communications system utilizes a transmitter located at the transmitting location to transmit a digital communications signal across a physical communication medium (aka. a communications channel) to a receiver located at the receiving location. The digital communications signal is typically made up of a series of voltage pulses of multiple different voltage levels measured at equal time periods (aka. equal time slices). In practice, a voltage level is based on a voltage range. For instance, a "target voltage" may be at the center of a voltage range, but any voltage between the minimum voltage and maximum voltage of the range is interpreted to be the "target voltage." As an example, for a binary digital voltage system, a first voltage level represents a first digital value and a second voltage value represents a second digital value. A voltage value below a "threshold" value is interpreted as a pulse representing the first digital value while a voltage value above the "threshold" value is interpreted as a pulse representing the second digital value. Often the first and second digital values are called either "off" and "on" or "0" and "1." Often the nomenclature is interchangeable between off/on and 0/1 such that a "0" is "off" and a "1" is "on." In many cases a 0.0V voltage value represents an "off" data value and a 1.0V voltage value represents an "on" data value, but the actual voltage values may be changed as desired by the system developer to meet the technical requirements of the system and the hardware selected for the system. Sometimes the actual voltage levels utilized in communications system may be "normalized" to 0.0V for "off" and 1.0V for "on" in order to simplify the discussion of the operation of the communications system. The pulses are typically sent by the transmitter as a series of pulses with each pulse having a width of one time period/time slice. The receiver measures the voltage level of the signal once each time period to obtain the "pulse" data value. Often, the pulse is read by the receiver at the center of the pulse width.

In an ideal system, the pulses are pure square waves and the communications channel carries the pulses without any loss or distortion. In a real world application each pulse has a non-rectangular wave shape and there is distortion introduced into the signal by the communications channel. Some types of distortion include impairments such as: noise, crosstalk, and Inter-Symbol Interference (ISI). In a SERial-DESerializer (SerDes) scenario, the physical implementation of the communications channel may be cables, backplane traces, etc., which introduce (ISI) into the communications signal. Typical real-world communications channels are limited such that a signal pulse frequency cannot exceed a particular high frequency value because of the distortion introduced by the communications channel, which typically has a low-pass filtering effect. Different filters, equalizers, and other compensation techniques have been utilized to attempt to compensate for the distortion introduced by the communications channel.

SUMMARY OF THE INVENTION

An embodiment of the present invention may comprise a method to adapt coefficients of taps of a Finite Impulse Response (FIR) filter to increase elimination of interference from a digital communications signal comprising: transmitting the digital communications signal on a communications channel; eliminating at a least a portion of interference introduced into the digital communications signal by passing the digital communications signal through the Finite Impulse Response (FIR) filter to create a FIR filtered signal, the FIR filter having at least one pre/post cursor tap that has a pre/post cursor tap coefficient; passing the FIR filtered signal over the communications channel causing the FIR filtered signal to be distorted by the interference to create a received signal that is passed to a quantifier as a quantifier input signal; quantifying the quantifier input signal with the quantifier into quantifier decisions; calculating an error signal by taking a difference between the quantifier decisions and the quantifier input signal; calculating a pre/post cursor tap coefficient adjustment value for the pre/post cursor tap coefficient of the at least one pre/post cursor tap as a function of the error signal and at least two of the quantifier decisions; sending the pre/post cursor tap coefficient adjustment value to the FIR filter; adjusting the pre/post cursor tap coefficient of the at least one pre/post cursor tap by the pre/post cursor tap coefficient adjustment value in order to adapt the FIR filter to increase elimination of the interference; and, receiving the digital communications signal as the quantifier decisions corresponding to the digital communications signal.

An embodiment of the present invention may further comprise an electronic communications system that adapts coefficients of taps of a Finite Impulse Response (FIR) filter to increase elimination of interference from a digital communications signal comprising: a communications channel; a transmitter that transmits the digital communications signal on the communications channel; the Finite Impulse Response Filter (FIR) that eliminates at a least a portion of the interference introduced into the digital communications signal by passing the digital communications signal through the FIR filter to create a FIR filtered signal, the FIR filtered signal being passed over the communications channel to create a received signal that is passed to a quantifier as a quantifier input signal, the FIR filter having at least one pre/post cursor tap that has a pre/post cursor tap coefficient that adjusts an effect of the at least one pre/post cursor tap on the FIR filtered signal; the quantifier that quantifies the quantifier input signal into quantifier decisions; an error summer that calculates an error signal by taking a difference between the quantifier decisions and the quantifier input signal; a pre/post cursor tap coefficient adjustment value subsystem that calculates a pre/post cursor tap coefficient adjustment value for the pre/post cursor tap coefficient of the at least one pre/post cursor tap as a function of the error signal and at least two of the quantifier decisions; a feedback transmission system that sends the pre/post cursor tap coefficient adjustment value to the FIR filter; a pre/post cursor tap coefficient adjustment subsystem that adjusts the pre/post cursor tap coefficient of the at least one pre/post cursor tap by the pre/post cursor tap coefficient adjustment value in order to adapt the FIR filter to increase elimination of the interference; and, a receiver that receives the digital communications signal as the quantifier decisions corresponding to the digital communications signal.

An embodiment of the present invention may further comprise an electronic communications system that adapts coefficients of taps of a Finite Impulse Response (FIR) filter to increase elimination of interference from a digital communications signal comprising: means for transmitting the digital communications signal on a communications channel; means for eliminating at a least a portion of the interference introduced into the digital communications signal by passing the digital communications signal through the Finite Impulse Response (FIR) filter to create a FIR filtered signal, the FIR filter having at least one pre/post cursor tap that has a pre/post cursor tap coefficient; means for passing the FIR filtered signal over the communications channel causing the FIR filtered signal to be distorted by the interference to create a received signal that is passed to a quantifier as a quantifier input signal; means for quantifying the quantifier input signal with the quantifier into quantifier decisions; means for calculating an error signal for the quantifier decisions; means for calculating a pre/post cursor tap coefficient adjustment value for the pre/post cursor tap coefficient as a function of the error signal and at least two of the quantifier decisions; means for sending the pre/post cursor tap coefficient adjustment value to the FIR filter; means for adjusting the pre/post cursor tap coefficient of the at least one pre/post cursor tap by the pre/post cursor tap coefficient adjustment value; and, means for receiving the digital communications signal as the quantifier decisions corresponding to the digital communications signal.

BRIEF DESCRIPTION OF THE DRAWINGS

In the drawings,

FIG. 3 is a channel pulse response graph that shows the pre and post cursor Inter-Symbol Interference (ISI) introduced by a communications channel.

FIG. 4A is a conceptual diagram plus the associated mathematical equations representing the precursor effect of a Finite Impulse Response (FIR) filter equalization system.

FIG. 4B is a pulse response graph showing the pulse response of a communications system with and without a precursor FIR filter.

DETAILED DESCRIPTION OF THE INVENTION

Figure 1:
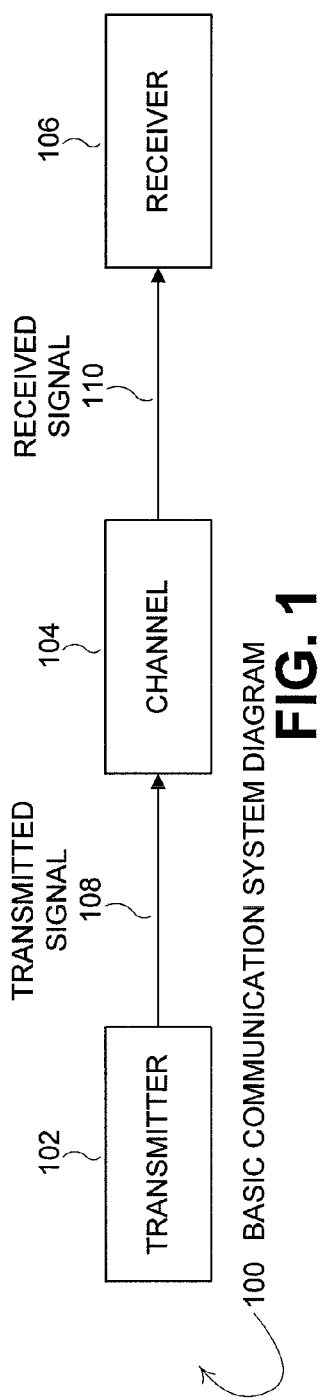
FIG. 1 is a diagram of a basic communication system.

FIG. 1 is a diagram of a basic communication system 100. In a basic communications system 100, a transmitter 102 sends a signal 108 over a communications channel 104 to a receiver 106. The communications channel 104 (aka. communication medium) in an ideal system does not distort the signal 108, so the received signal 110 is equal to the transmitted signal 108. For a digital communications system, the signal 108, 110 is comprised of a series of pulses. For an ideal channel 104, the transmitter 102 sends pulses of perfect square waves, which are not distorted by the ideal channel 104 and are read/decoded by the receiver 106 without errors. For the ideal system there is a flat gain over the frequency domain, implying an infinite frequency bandwidth for the ideal channel 104. In a real-world, practical communications system 100, the received signal 110 is corrupted and/or distorted by the physical communications mediums that make up the communications channel 104. Common non-ideal channel 104 impairments may include general noise/interference, crosstalk, and/or Inter-Symbol Interference (ISI). For a SERializer-DESerilizer (SerDes) scenario, the channel 104 may be physically comprised of cables, backplane traces, and/or other communications media. Typically, the frequency bandwidth of a real-world communications system 100 is limited due to high frequency losses of the real-world implementation of the communications channel 104.

Figure 2:
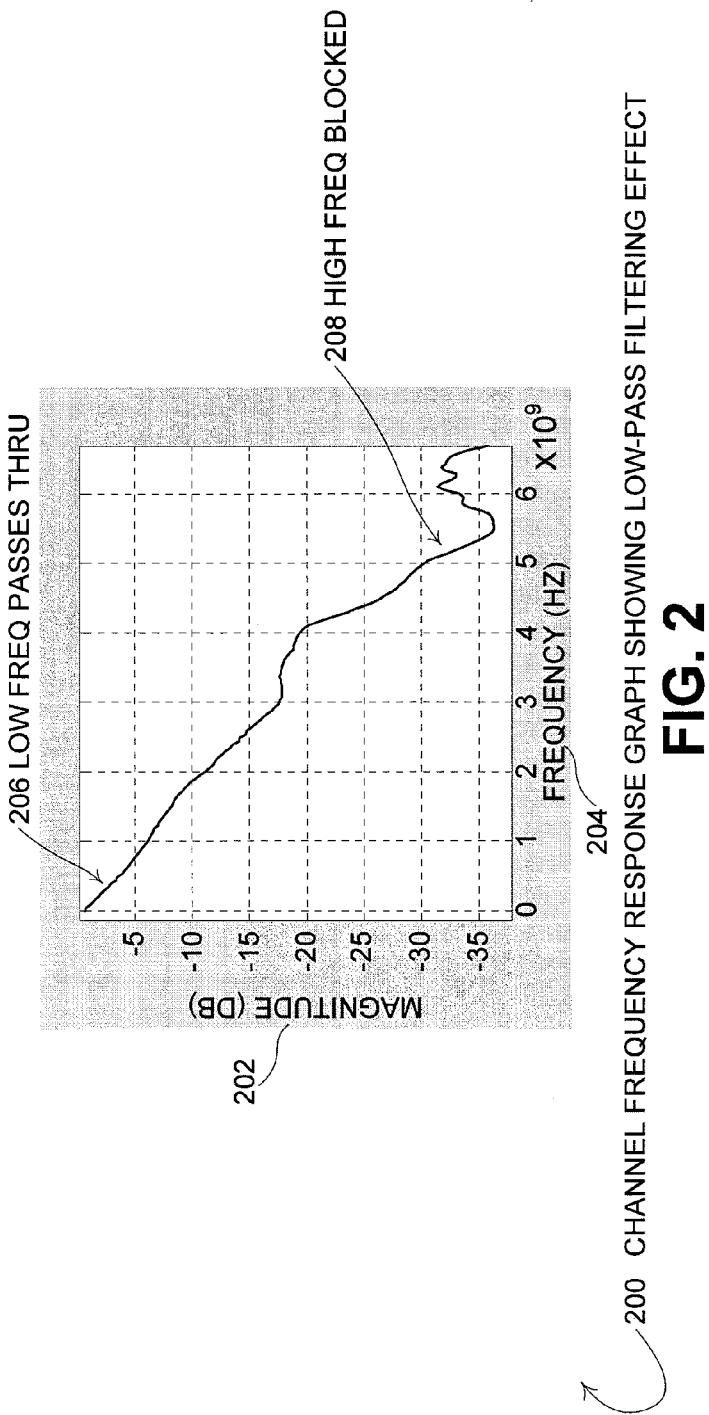
FIG. 2 is a channel frequency response graph showing the low-pass filtering effect of a real-world communications channel.

FIG. 2 is a channel frequency response graph 200 showing the low-pass filtering effect of a real-world communications channel. The results depicted in the channel frequency response graph 200 were obtained by taking measurements of an operating, real-world communications system. In the channel frequency response graph 200, the frequency 204, measured in GHz (Hz×$10^9$), is plotted against the magnitude 202 of the signal, measured in dB. In looking at the frequency response graph 200, low frequency signals 206 are passed with a high magnitude that decreases at a near linear rate to a low magnitude for high frequency signals 208. By inspection of the graph it is clear that a real-world communications channel displays a strong low pass frequency filtering effect (see 206 to 208).

FIG. 3 is a channel pulse response graph 300 that shows the pre 314 and post 316 cursor Inter-Symbol Interference (ISI) introduced by a communications channel 304. Both the input 302 and output 306 graphs chart the amplitude 318 of the signal voltage versus the time 320. At the left of the drawing is a graph of the input 302 to the channel 304. The input 302 to the channel 304 is a square wave with an amplitude 308 of 1.0V. The square wave 302 is also often called a pulse. For communications, the pulse function represents a data value, thus the pulse may also be referred to as a symbol, bit, data value, and/or other terms that indicate the data being represented by the pulse instead of the actual voltage values of the pulse. For the binary digital system depicted in FIG. 3, the lo (i.e., starting) voltage 322 is 0.0V and the hi (i.e., peak) voltage 320 is 1.0V. Other systems may have an amplitude 308 different than 1.0V. Further, the lo voltage 322 may be different than 0.0V and/or the hi voltage 320 may be different than 1.0V. Also, the hi voltage value 320 of a pulse typically indicates an "on" or "1" data value while the lo voltage value 322 of the pulse typically indicates an "off" or "0" data value. Some systems may conceptually reverse the hi/lo meanings such that the hi voltage value 320 is interpreted as an "off" or "0" data value and the lo voltage value 322 is interpreted as an "on" or "1" data value. For the system of FIG. 3, the period 310 (aka. time slice) of the pulse 302 is measured in time units. That is, the actual period is normalized to a time unit (UI) and the input pulse 302 to the channel 304 and the output 306 from the channel 304 use a normalized time scale measured in UI. The UI time unit may also be referred to as the width of one bit of the digital communications signal. As is clear from the use of a normalized time scale, the actual, real-world pulse width may be set as appropriate given the low-pass frequency effect of the communications channel 304 described in the disclosure with respect to FIG. 2. Typically the receiving system reads the pulse value at the center 312 of the pulse width 310.

In looking at the output 306 of the channel 304 for the input pulse 302, pre 314 and post 316 cursor Inter-Symbol Interference (ISI) is apparent. As can be seen, both pre 314 and post 316 cursor include extra leading 314 and trailing voltage 316 not included in the input pulse 302. Further, the postcursor ISI 316 extends for a greater period of time than the precursor ISI 314 and appears to include a gradually diminishing affect for pulses further away from the current pulse as indicated by the diminishing wavy nature of the curve from roughly 4 UI to 10 UI. Since Inter-Symbol Interference (ISI) 314, 316 is caused by future (i.e., precursor) 314 and past (i.e., postcursor 316) pulses sent over the communications channel, it is possible to mathematically represent the ISI 314, 316 in terms of the pulse response function of the channel 304.

In Eqs. 1-4 Below, y(t) represents the output 306 from the channel 304, p represents the pulse function of the channel 304, $a_k$ represents the transmitted bits {0,1}, k represents the index number in the series of transmitted bits, t represents the time, and T is a constant duration of one bit cell width (1 UI). Breaking down the system of FIG. 3 into mathematical terms, the pulse response (p(t)) of the channel 304 that introduces the pre 314 and post 316 ISI may be defined as the system response to a single "1" data pulse. By writing the output (y(t)) 306 as a linear supposition of the pulse responses (p(t)) of a series of pulses sent in a digital communications signal, Eq. 1 may be said to mathematically represent the output 306 (y(t)) of the channel. Assuming that the sample time t is 0, Eq. 1 may be rewritten as Eq. 2. An ideal system does not have an effect from Inter-Symbol Interference (ISI) and may therefore be represented by Eq. 3. Therefore, to obtain the unwanted portion of the sample, one would subtract Eq. 3 from Eq. 2 to obtain Eq. 4.

Output 306 of a linear supposition of a series of pulse responses:

$$y(t) = \sum_k a_k p(t - kT)$$ Eq. 1

Sampled output 306 at time t=0:

$$y(0) = \sum_k a_k p(-kT)$$ Eq. 2

Ideal sampled output 306 at time t=0:

$$y(0) = a_0 p(0)$$ Eq. 3

Unwanted portion of the sample output 306 at time t=0:

$$y(0) - a_0 p(0) = \sum_{k \neq 0} a_k p(-kT)$$ Eq. 4

As may be observed from Eq. 4, the unwanted portion of the output (y(t)) 306 is a function of the past and future bits (pulses) sent over the channel.

FIG. 4A is a conceptual diagram 400 plus the associated mathematical equations 418, 420 representing the precursor effect of a Finite Impulse Response (FIR) filter equalization system. The conceptual diagram 400 of the precursor filter action of the FIR filter receives the communications signal ($a_k$) 402 and sends the signal $a_k$ 402 down two separate paths. On a first path, the signal $a_k$ 402 is sent to a delay block 404 that delays the signal $a_k$ 402 for one time slice (i.e., one UI) resulting in $a_{k-1}$ 406. On a second path, the signal $a_k$ 402 is adjusted by multiplying the signal $a_k$ 402 by an adjustable "precursor" coefficient α 414 via a multiplier 412 to result in $\alpha a_k$ 416. The delay block output $a_{k-1}$ 406 and the multiplier output $\alpha a_k$ 416 are summed together via summer 408. As indicated, the multiplier 412 output $\alpha a_k$ 416 is assigned a negative value in the summation 408. Other embodiments may choose to incorporate the negative assignment into the determination of the "precursor" coefficient α 414. The result of the summer 408 is the filtered signal $b_k$ 410. Mathematically, the transfer function 418 of the conceptual diagram 400 for the precursor portion of the FIR filter is equivalent to Eq. 5 below. The effective system equation 420 describing the output $b_k$ 410 of the conceptual diagram 400 of the precursor portion of the FIR filter is equivalent to Eq. 6 below.

Precursor Transfer Function:

$$-\alpha + \text{Delay}$$ Eq. 5:

Precursor System Equation:

$$b_k = -\alpha a_k + a_{k-1}$$ Eq. 6:

FIG. 4B is a pulse response graph 430 showing the pulse response of a communications system with 438 and without 436 a precursor FIR filter. The pulse response graph 430 plots the pulse response as normalized amplitude 432 versus time 434 of a real-world channel for a single pulse when a precursor portion of a FIR filter is included at the transmitter (TX) 438 and without a precursor portion of a FIR filter included at the TX 436. The amplitude 432 is normalized such that the desired pulse starts at 0.0 and reaches a peak of 1.0. In various embodiments, the actual voltage values of the amplitude 432 may differ from the 0.0 and 1.0 shown in FIG. 4B since the amplitude shown 432 is normalized. In the graph 430 shown in FIG. 4B, the time 434 is measured in ns (nano-seconds), but other embodiments may have a different time scale 434 to account for the varying pulse widths for various embodiments. As may be seen in the pulse response graph 430, the plot of the pulse response with the precursor portion of the FIR transmitter filter 436 narrows the pulse 440 in the precursor area of the channel output signal. The narrowing 440 of the plot of the pulse response with the precursor portion of the FIR transmitter filter 438 removes at least part of the precursor portion of ISI introduced by pulses sent after (precursor) the current pulse.

Figure 5B:
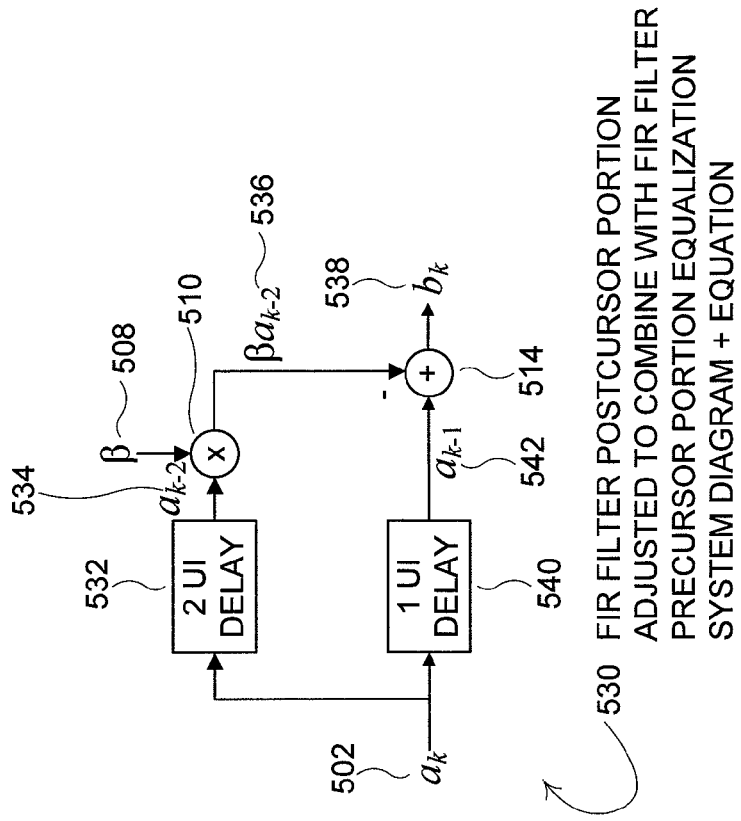
FIG. 5B is a conceptual diagram plus the associated mathematical equation representing the postcursor affect of a Finite Impulse Response (FIR) filter equalization system as adjusted to be combined with a precursor portion of the FIR filter.
Figure 5A:
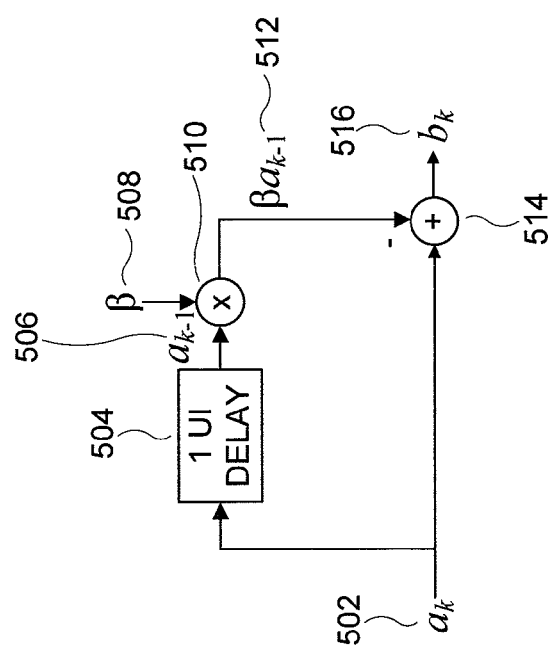
FIG. 5A is a conceptual diagram plus the associated mathematical equations representing the postcursor affect of a Finite Impulse Response (FIR) filter equalization system.

FIG. 5A is a conceptual diagram 500 and the associated mathematical equations 518, 520 representing the postcursor effect of a Finite Impulse Response (FIR) filter equalization system. The conceptual diagram 500 of the postcursor filter action of the FIR filter receives the communications signal ($a_k$) 502 and sends the signal $a_k$ 502 down two separate paths. On a first path, the signal $a_k$ 502 is sent to a delay block 504 that delays the signal $a_k$ 502 for one time slice (i.e., one UI) resulting in $a_{k-1}$ 506. The delayed signal $a_{k-1}$ 506 is multiplied times an adjustable "postcursor" coefficient $\beta$ 508 via multiplier 510 to result in $\beta a_{k-1}$ 512. On a second path, the signal $a_k$ 502 is not changed and is sent directly to the summer 514. The multiplier output $\beta a_{k-1}$ 512 and the unchanged signal $a_k$ 502 are summed together via summer 514. As indicated, the multiplier 510 output $\beta a_{k-1}$ 512 is assigned a negative value in the summation 514. Other embodiments may choose to incorporate the negative assignment into the determination of the "postcursor" coefficient $\beta$ 508. The result of the summer 514 is the filtered signal $b_k$ 516. Mathematically, the transfer function 518 of the conceptual diagram 500 for the postcursor portion of the FIR filter is equivalent to Eq. 7 below. The effective system equation 520 describing the output $b_k$ 516 of the conceptual diagram 500 of the postcursor portion of the FIR filter is equivalent to Eq. 8 below.

Postcursor Transfer Function:

$$1-\beta \text{Delay} \qquad \text{Eq. 7:}$$

Postcursor System Equation:

$$b_k = a_k - \beta a_{k-1} \qquad \text{Eq. 8:}$$

FIG. 5B is a conceptual diagram 530 plus the associated mathematical equation 544 representing the postcursor affect of a Finite Impulse Response (FIR) filter equalization system as adjusted to be combined with a precursor portion of the FIR filter. See the disclosure with respect to FIGS. 4A&B for more information about the precursor portion of the FIR filter. In order to isolate the "precursor" adjustment coefficient $\alpha$ 414 from the postcursor system 500 so that the precursor and postcursor portions of the FIR filter may operate simultaneously, a second delay is added to the postcursor FIR system 530 being adjusted for combination with the precursor FIR system 400. The primary difference between the non-adjusted postcursor FIR filter system 500 of FIG. 5A and the adjusted postcursor FIR system 530 of FIG. 5B is the addition of a 1 UI delay block 540 in the direct $a_k$ signal path 502 and the change from a 1 UI delay block 506 to a 2 UI delay block 532 in the delayed signal path. The output 534 of the 2 UI delay block 532 is now $a_{k-2}$ 534, which is multiplied times the postcursor coefficient $\beta$ 508 via multiplier 510 resulting in a multiplier 510 output value of $\beta a_{k-2}$ 536. The multiplier 510 output $\beta a_{k-2}$ 536 and the 1 UI delay block 540 output $\beta a_{k-2}$ 536 are summed together via summer 514. As indicated, the multiplier output $\beta a_{k-2}$ 536 is assigned a negative value in the summation 514. Other embodiments may choose to incorporate the negative assignment into the determination of the "postcursor" coefficient $\beta$ 508. The result of the summer 514 is the postcursor corrected signal $b_k$ 538 as adjusted for combination with the precursor portion of the FIR filter described in the disclosure with respect to FIG. 4. Mathematically, the effective system equation 544 describing the output $b_k$ 538 of the conceptual diagram 530 of the postcursor portion of the FIR filter as adjusted to be combined with the precursor portion of the FIR filter 400 is equivalent to Eq. 9 below.

Postcursor System Equation (adjusted to combine with FIR filter precursor portion):

$$b_k = a_{k-1} - \beta a_{k-2} \qquad \text{Eq. 9:}$$

Figure 5C:
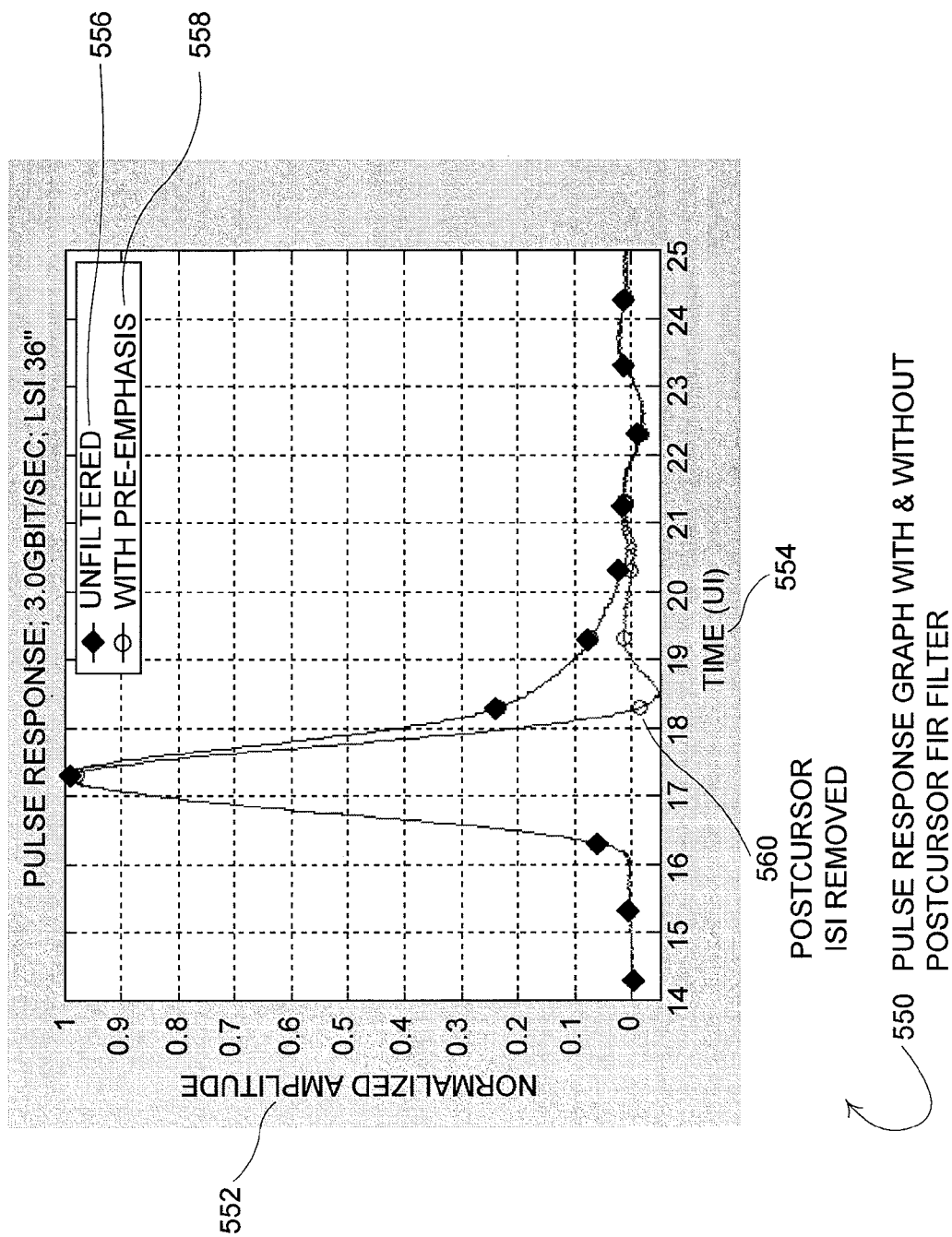
FIG. 5C is a pulse response graph showing the pulse response of a communications system with and without a postcursor FIR filter.

FIG. 5C is a pulse response graph 550 showing the pulse response of a communications system with 558 and without 556 a postcursor FIR filter. The pulse response graph 550 plots the pulse response as normalized amplitude 552 versus time 554 of a real-world channel for a single pulse when a postcursor portion of a FIR filter is included at the transmitter (TX) 558 and when there is not a postcursor portion of a FIR filter included at the transmitter (TX) 556. The amplitude 552 is normalized such that the desired pulse starts at 0.0 and reaches a peak of 1.0. In various embodiments, the actual voltage values of the amplitude 552 may differ from the 0.0 and 1.0 shown in FIG. 5C since the amplitude shown 552 is normalized. In the graph 550 shown in FIG. 5C, the time 554 is measured in UI which is a normalized value where one UI is equal to the width of one pulse. Various embodiments may utilize different time scales 434 to account for the varying pulse widths for the various embodiments. As may be seen in the pulse response graph 550, the plot of the pulse response with the postcursor portion of the FIR transmitter filter 556 narrows the pulse 560 in the postcursor area of the channel output signal. The narrowing 560 of the plot of the pulse response with the postcursor portion of the FIR transmitter filter 556 removes at least part of the postcursor portion of ISI introduced by pulses sent before (postcursor) the current pulse.

Figure 6:
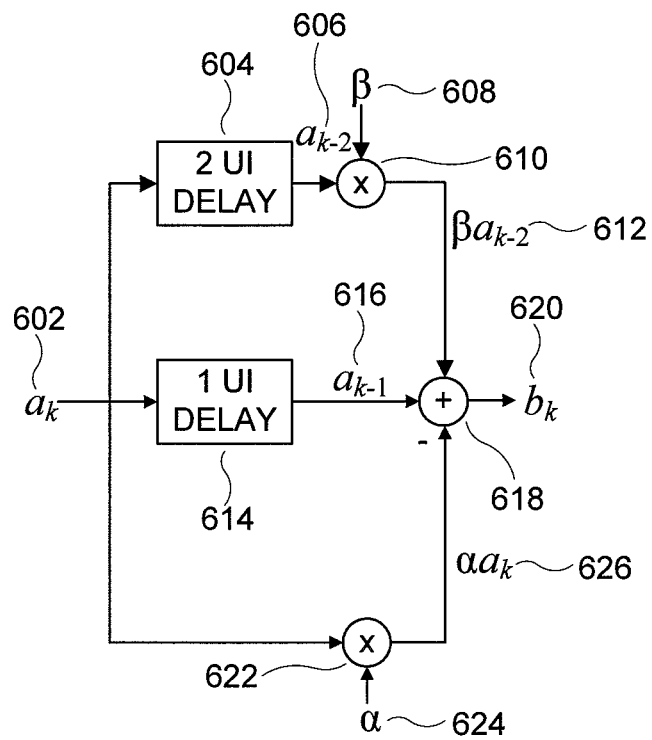
FIG. 6 is a conceptual diagram plus the associated mathematical equation representing the precursor affect combined with the postcursor affect of a Finite Impulse Response (FIR) filter equalization system.

FIG. 6 is a conceptual diagram 600 plus the associated mathematical equation 628 representing the precursor affect combined with the postcursor affect of a Finite Impulse Response (FIR) filter equalization system. By combining the precursor portion of the FIR filter shown in the conceptual diagram 400 of FIG. 4A with the postcursor portion of the FIR filter adapted for combination shown in the conceptual diagram 540 of FIG. 5B, the combined pre and post cursor portions of a FIR filter may be represented by the conceptual diagram 600 of FIG. 6. The combined pre and post cursor portions of the FIR filter system 600 receive the signal input $a_k$ 602 and send the signal $a_k$ through three paths before summing the signal back together with summer 618 to obtain the resulting signal $b_k$ 620. Over a first path the signal $a_k$ 602 is not delayed and is delivered to a multiplier 620 to be multiplied times the "precursor" coefficient $\alpha$ 624. The result of multiplier 622 is $\alpha a_k$ 626, which is delivered to the summer 618. As indicated, the multiplier 622 output $\alpha a_k$ 626 is assigned a negative value in the summation 618. Other embodiments may choose to incorporate the negative assignment into the determination of the "precursor" coefficient $\alpha$ 624. Over a second path, the signal $a_k$ 602 is delayed one time slice (i.e., one UI) at delay block 614 and then passed on to the summer 618. The output of delay block 614 is then $a_{k-1}$ 616. Over a third path the signal $a_k$ 602 is delayed two time slices (i.e., two UI) at delay block 604. The output of the two UI delay block 604 is then $a_{k-2}$ 606. At multiplier 608 the output of the two UI delay block 604 is multiplied times the "postcursor" coefficient $\beta$ 606 to result in $\beta a_{k-2}$ 610. The multiplier 608 output $\beta a_{k-2}$ 610 is delivered to the summer 616. Whether the multiplier 608 output $\beta a_{k-2}$ 610 is positive or negative is incorporated into the determination of the postcursor coefficient $\beta$ 606. Other embodiments may choose to incorporate a negative assignment into the characteristics of the summer 618. At the summer 616, the multiplier 608 output $\beta a_{k-2}$ 610 and the multiplier 622 output $\alpha a_k$ 626 are subtracted from the one UI delay block 612 output $a_{k-1}$ 614 to result in the combined pre and post cursor portions FIR filter system output $b_k$ 620. The system equation 628 for the combined pre and post cursor FIR filter system may be written as Eq. 10 below.

Pre and Post Cursor System Equation:

$$b_k = -\alpha a_k + a_{k-1} - \beta a_{k-2} \quad \text{Eq. 10:}$$

In looking at Eq. 10, it is apparent that the precursor coefficient $\alpha$ 624 operates on the undelayed signal $a_k$ 602 and that the postcursor coefficient $\beta$ 620 operates on the twice delayed signal $a_{k-2}$ 606. Thus, a main cursor coefficient would operate on the once delayed signal $a_{k-1}$ 616. Therefore, the primary signal component, after passing through the FIR filter, is the once delayed signal $a_{k-1}$ 616. In Eq. 10, the main cursor coefficient is the value "1," but the main cursor coefficient may be manipulated to increase or decrease the effective gain on the primary/main signal $a_{k-1}$ 616 as desired to overcome noise and signal loss introduced in the channel. The precursor coefficient $\alpha$ 624 and postcursor coefficient $\beta$ 608 may be adjusted to account for the Inter-Symbol Interference (ISI) measured in a feedback loop at the receiver and communicated to the FIR filter over a back-channel. The back-channel may also be implemented by utilizing a portion of the primary communications channel and/or may be implemented as a physical channel that is entirely separate from the primary channel.

Figure 7:
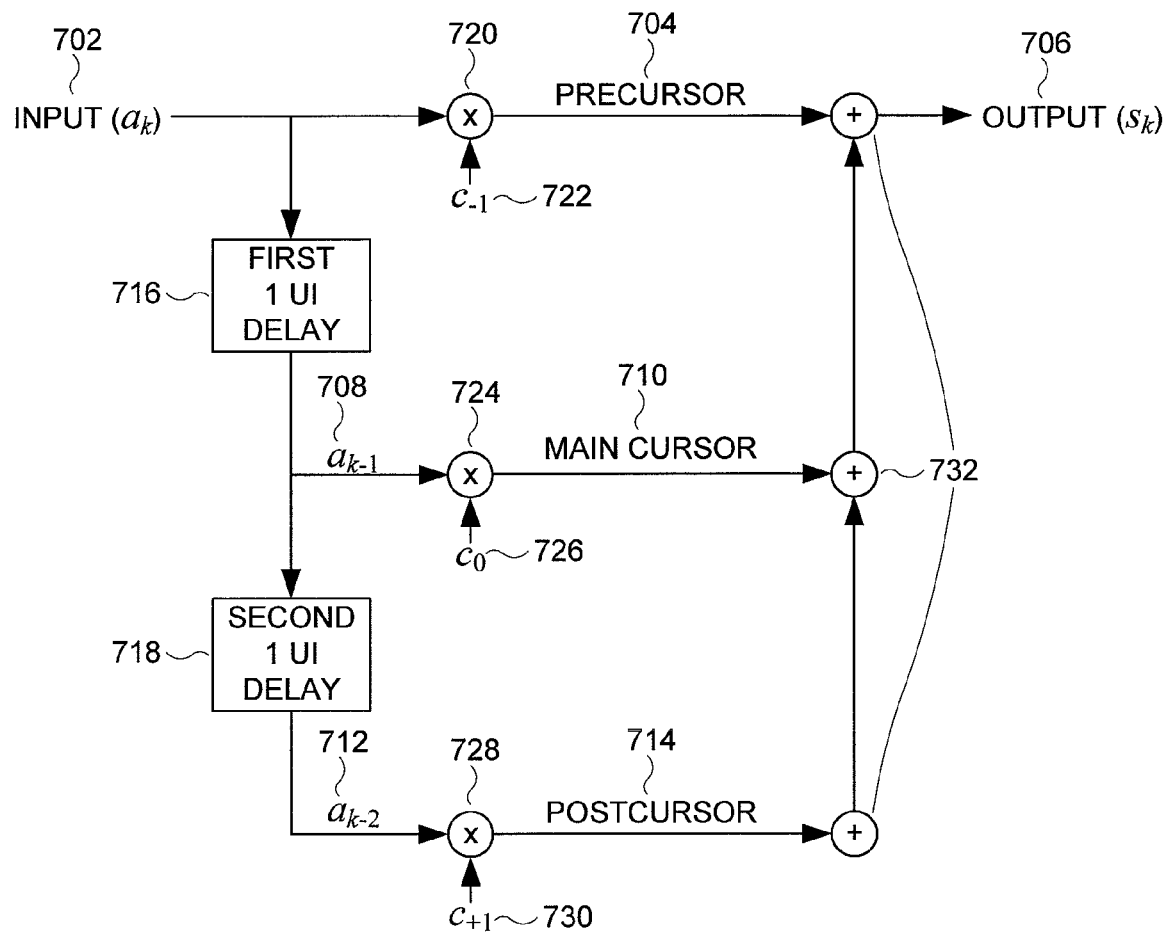
FIG. 7 is a block diagram plus the associated mathematical equation representing a 3 tap FIR filter.

FIG. 7 is a block diagram 700 plus the associated mathematical equation 738 representing a 3 tap FIR filter. The block diagram 700 shows an embodiment of a real world construction of the combined, simultaneously operating pre and post cursor system 600 disclosed with respect to FIG. 6. The input ($a_k$) 702 is sent over two paths. On a first path for input $a_k$ 702, the input $a_k$ 702 is sent to a multiplier 720 where the input $a_k$ 702 is multiplied times the precursor coefficient $c_{-1}$ 722 of the FIR filter precursor tap resulting in a precursor correction signal 724 to the main cursor signal 710 via summer 732. Whether the precursor correction signal 704 is positive or negative is incorporated into the determination of the precursor coefficient $c_{-1}$ 730. Other embodiments may choose to incorporate a negative assignment to the precursor correction signal 704 into the characteristics of the summer 732. In the block diagram 700 of FIG. 7, the summer 732 is drawn as three separate summation blocks to more closely match standard FIR filter representations. Various embodiments may implement the summer 732 as a single summer/calculation or as multiple summers/calculations, as desired by the system designer. On a second path for input $a_k$ 702, the signal is delayed at a first 1 UI delay block 716 resulting in a once delayed signal $a_{k-1}$ 708. The once delayed signal $a_{k-1}$ 708 is also sent over two paths. On a first path for the once delayed signal $a_{k-1}$ 708, the once delayed signal $a_{k-1}$ 708 is sent to a multiplier 724 where the once delayed signal $a_{k-1}$ 708 is multiplied times the main cursor coefficient $c_0$ 726 of the FIR filter main cursor tap, resulting in the main cursor signal 710, which is corrected by the precursor 704 and postcursor 714 correction signals via summer 732. On a second path for once delayed signal $a_{k-1}$ 708, the signal is delayed at a second 1 UI delay block 718 resulting in a twice delayed signal $a_{k-2}$ 712. The twice delayed signal $a_{k-2}$ 712 is sent to a multiplier 728 where the twice delayed signal $a_{k-2}$ 712 is multiplied times the postcursor coefficient $c_{+1}$ 730 of the FIR filter postcursor tap resulting in a postcursor correction signal 714 to the main cursor signal 710 via the summer 732. Whether the postcursor correction signal 714 is positive or negative is incorporated into the determination of the postcursor coefficient $c_{+1}$ 730. Other embodiments may choose to incorporate a negative assignment to the postcursor correction signal 714 into the characteristics of the summer 732. The summer 732 adds together the precursor correction signal 704, the main cursor signal 710, and the postcursor correction signal to obtain the output ($s_k$) 706. The system equation 734 for the 3 tap FIR filter shown in block diagram 700 of FIG. 7 may be written as Eq. 11 below.

Pre and Post Cursor System Equation:

$$s_k = c_{-1} a_k + c_0 a_{k-1} + c_{+1} a_{k-2} \quad \text{Eq. 11:}$$

Figure 8:
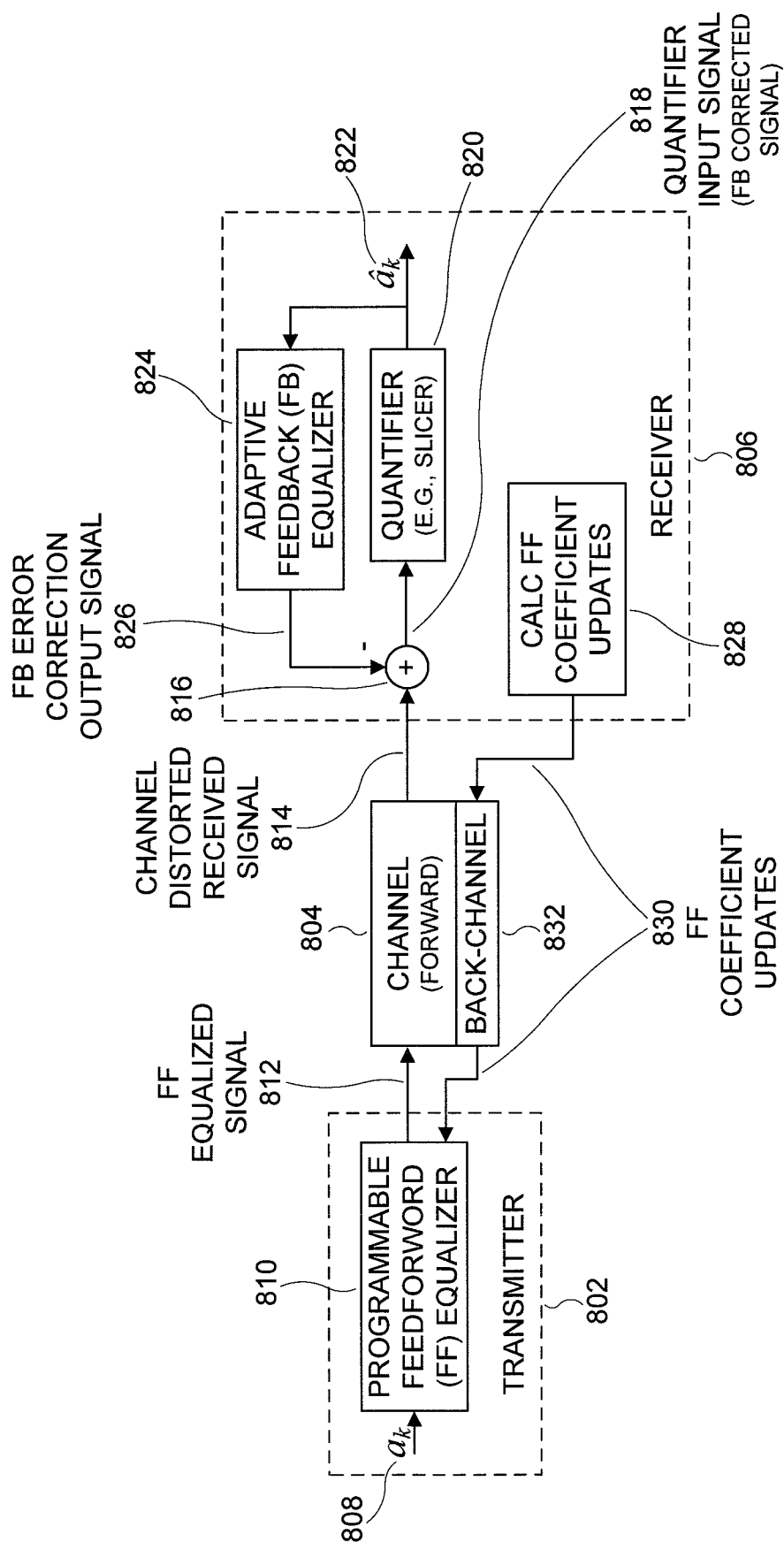
FIG. 8 is mid-level detail diagram of a communication system that includes a programmable FeedForward (FF) equalizer in the transmitter and an adaptive FeedBack (FB) equalizer in the receiver.

FIG. 8 is mid-level detail diagram 800 of a communication system that includes a programmable FeedForward (FF) equalizer 810 in the transmitter 802 and an adaptive FeedBack (FB) equalizer 824 in the receiver 806. In a basic communications system, a transmitter 802 sends a signal ($a_k$) 808 over a channel 804 to a receiver 806. As described above, an ideal channel 804 may transmit the signal $a_k$ 808 without affecting the signal $a_k$ 808. Since the signal $a_k$ 808 is not affected by the channel 804, the receiver 806 may decode the signal $a_k$ 808 without performing any additional processing on the signal $a_k$ 808. In a real world application, the channel 804 may introduce significant signal impairments, such as crosstalk, Inter-Symbol Interference (ISI), as well as other types of signal impairments. One significant signal impairment for many digital communications applications is Inter-Symbol Interference (ISI). Since ISI is a function of the other pulses (aka. symbols) sent over the channel 804 before and after the current pulse, it is often possible to mitigate impairments caused by ISI by filtering the signal $a_k$ 808 since the nature of the pulses before and after the current pulse may be known and may be characterized in such a way as to permit an adaptation of the signal $a_k$ 808 to eliminate much of the ISI introduced by the channel 804.

A system that may be used to mitigate the ISI in a communications signal is shown in the mid-level detail diagram 800 of FIG. 8. A signal $a_k$ 808 is created and the transmitter 802 sends the signal $a_k$ 808 over the channel 804 to the transmitter 806. A programmable FeedForward (FF) equalizer 810 filters the signal $a_k$ 808 prior to placing the signal on the communications channel 804 for transmission to the receiver 806. The FeedForward (FF) equalizer 810 conditions the signal such that the FF equalized signal 812 has characteristics that counteract the ISI introduced by the channel 804. In the diagram 800 shown in FIG. 8, the programmable FeedForward (FF) equalizer 810 is shown as part of the transmitter 802. Various embodiments may incorporate the programmable FF equalizer 810 as a separate device/system from the transmitter 802. The FF equalized signal 812 is sent over the channel 804 and the channel 804 characteristics (i.e., channel pulse response function) acts on the FF equalized signal 812, changing the FF equalized signal 812 into a channel distorted signal 814 at the receiver 806.

For the embodiment shown in FIG. 8, the receiver 806 receives the channel distorted received signal 814 and passes the signal through a feedback loop comprising a summer 816, a quantifier/decision system 820, and an adaptive FeedBack (FB) equalizer 824. Other embodiments may not include the adaptive feedback equalizer 824. For an embodiment that does not include the adaptive feedback equalizer 824, the summer 816 is not necessary and the quantifier input signal 818 is the channel distorted received signal 814. For embodiments with an adaptive feedback equalizer 824 similar to the embodiment shown in FIG. 8, the summer 816 is necessary and the quantifier input signal 818 may also be referred to as the FeedBack (FB) corrected signal 818. For the embodiment shown in FIG. 8, the channel distorted received signal 814 is summed with the FeedBack (FB) correction output signal 826 that is an output of the adaptive FeedBack (FB) equalizer 824 at the summer 816. The FeedBack corrected signal 818 results from the summation 816 and is passed to the quantifier 820 as the quantifier input signal 818. As indicated, the FB correction output signal 826 is assigned a negative value in the summation 816. Other embodiments may choose to incorporate the negative assignment into the determination of the FB error correction signal 826. Still other embodiments may not include the adaptive FeedBack equalizer 824 and simply process the received signal 814 without further signal filtering as the quantifier input signal 818. A quantifier 820 may be a device, system, sub-system, process, etc. that acts a decision system/decision device that receives an input signal 818 and quantifies/decides on an output quantifier decision value 822 in accordance with the digital format/structure of the input signal 818. A common type of quantifier 820 is a slicer. A quantifier 820 may produce a "hard" decision 822 that is a single specific value assigned for each digital state/range of the quantifier input 818, as may be done with a slicer. A quantifier 820 may alternately provide a "soft" decision 822 such that the quantifier decision may be adjusted up and down within the range of the applicable digital value ranges for the quantifier decisions as a function of the quantifier input voltage. For a binary format digital system using a slicer as the quantifier, the quantifier 820 quantifies the FB corrected signal 818 into one of two digital decisions corresponding to an "on"/"1" data value or an "off"/"0" data value by making "decisions" based on a threshold value. For instance, in an embodiment where "on"/"1" is represented by a voltage higher than the voltage for "off"/"0" data values, the quantifier 820 may decide that voltages above a threshold value indicate an "on"/"1" data value while voltages below the threshold value indicate an "off"/"0" data value. For other multi-state format digital systems with more than two states, the quantifier 820 quantifies the quantifier input digital signal 818 into one of the appropriate data values of the multiple digital data values based on the data value ranges assigned for the multi-state digital format. The quantifier output (aka. quantifier decisions) $\hat{a}_k$ 822 is delivered by the receiver 806 as the receiver output (i.e., the final received signal). The quantifier decisions $\hat{a}_k$ 822 are also fed back to the channel distorted received signal 814 through the adaptive FB equalizer 824 to provide feedback error correction via a feedback loop.

For optimum performance, the coefficients that control the programmable FeedForward (FF) equalizer 810 should be adapted to the particular channel 804 utilized in the communication system 800. If the pulse response of the communications channel 804 remained constant, the coefficient settings for the programmable FF equalizer 810 may be determined one time at system commissioning and remain fixed thereafter. In the real world, the pulse response of the channel 804 may fluctuate significantly during system 800 operation. There may be numerous causes for the change in pulse response of the channel 804, including: temperature changes, humidity changes, power supply voltage/current fluctuations, cable movement, and many other circumstances that may cause the electrical characteristics of the channel 804 to change. An adaptation algorithm of an embodiment may be used to determine the FIR coefficients for a system that has a channel 804 with a changing pulse response function as well as for a system with a channel 804 that does not have a changing pulse response function. For an embodiment with a channel 804 that does not have a changing pulse response function, the adaptation algorithm determines the FIR coefficient values and then may not make any, or very few, updates to the FIR coefficient values during further system operation. To accommodate changes in the pulse response function of the channel 804, the coefficients of the programmable FF equalizer 810 may need to be adapted (i.e., updated) while the pulses of the data signal $a_k$ 808 are being transmitted. Adaptation algorithms to update the coefficients of the programmable FF equalizer 810 are typically performed on the channel distorted received signal 814 or the FB corrected signal 818 (if an adaptive FeedBack equalizer 824 is included in the system 800) since the channel distorted signal 814 or the FB corrected signal 818 include the results of the impairments induced by the channel 804 pulse response function. A logical location for implementation of the adaption algorithms is in the receiver 806 since the receiver 806 has access to signals that may be used to update the programmable FF equalizer 810 coefficients. Thus, the calculation 828 of FF coefficient updates 830 in the receiver 806 may include a system/sub-system 828 to calculate updates to the FeedForward (FF) equalizer 810 coefficients based on the various signals 814, 818, 822, and 826 available in the receiver 806. Once the FF coefficient updates 830 are calculated at 828, the FF coefficient updates 830 may be communicated back to the programmable FF equalizer 810 over a back-channel 832. The back-channel 832 may be implemented by utilizing some of the bandwidth available to the forward/primary channel 804 on the physical transmission medium of the forward/primary channel 804. In other embodiments, a separate physical communications medium may be provided to implement the back-channel 832 communications connection.

Figure 9:
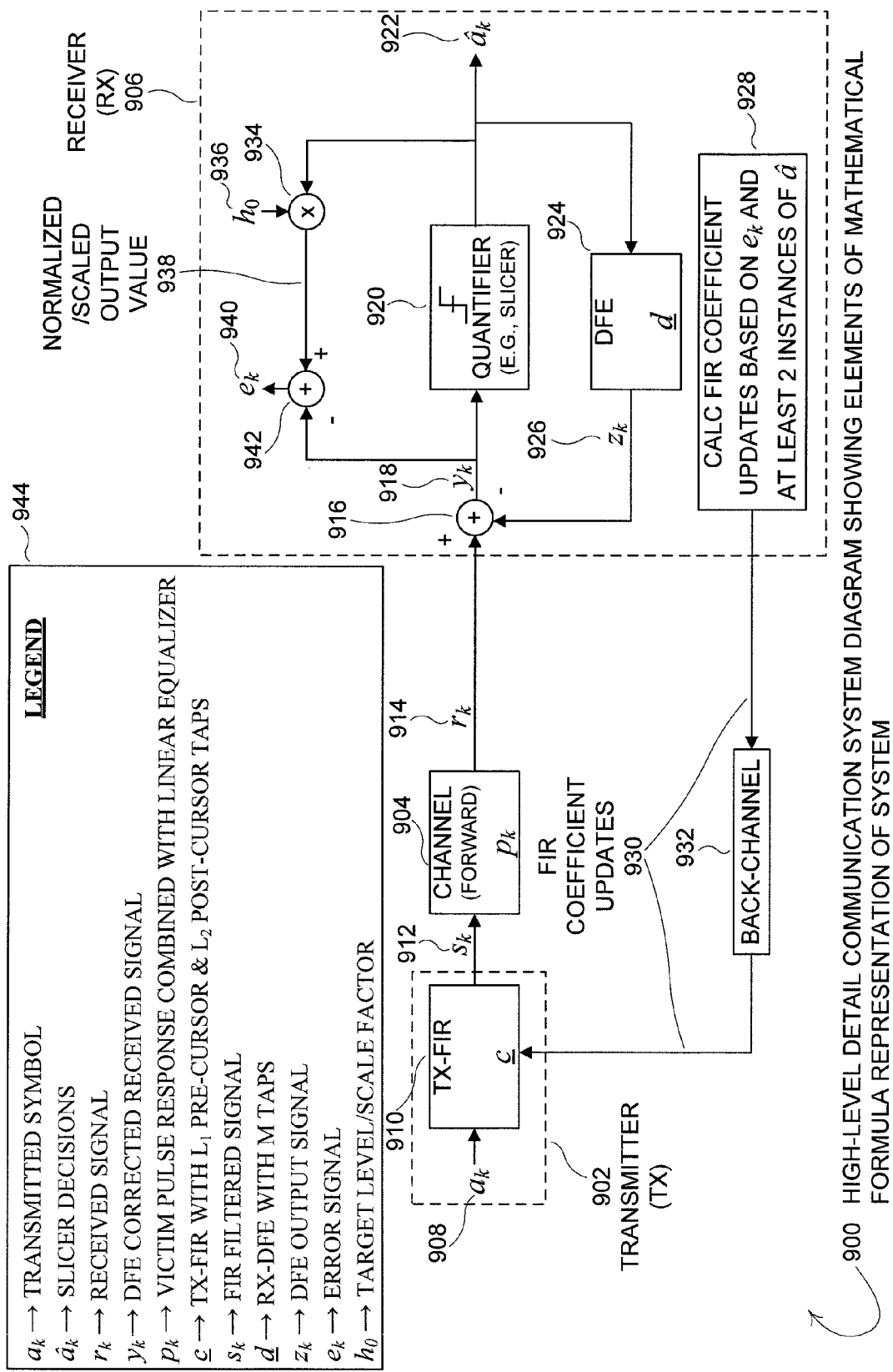
FIG. 9 is high-level detail diagram of a communication system showing the various components of the communication system and the mathematical expression for each component within a mathematical formula representation of the communication system.

FIG. 9 is high-level detail diagram 900 of a communication system showing the various components of the communication system and the mathematical expression for each component within a mathematical formula representation of the communication system. To assist the reader, a legend 944 describing the mathematical variables contained on the diagram is presented as part of FIG. 9. In the embodiment shown in FIG. 9, the transmitter (TX) 902 obtains a communications signal (i.e., series of symbols/pulses) $a_k$ 908 to transmit to the receiver (RX) 906 over a forward/primary channel 904, where the channel 904 has a pulse response function $p_k$. At the transmitter 902, the communications signal $a_k$ 908 is passed through a Finite Impulse Response (FIR) filter c 910. The FIR filter 910 acts as the programmable FeedForward equalizer 810 as described in the disclosure with respect to FIG. 8. The output of the FIR filter $s_k$ 912 (i.e., the FIR filtered signal) is sent over the channel 904 to the receiver 906. The FIR filtered signal $s_k$ 912 is distorted by the pulse response $p_k$ of the channel 904 and becomes the received signal $r_k$ 914.

The receiver accepts the received signal $r_k$ 914 and delivers the received signal $r_k$ 914 to the summer 916. The summer 916 adds the received signal $r_k$ 914 to the Decision Feedback Equalizer (DFE) output signal $z_k$ 926 to obtain the DFE corrected signal $y_k$ 918. As indicated, the DFE output signal $z_k$ 926 is assigned a negative value in the summation 916 such that the DFE output signal $z_k$ 926 is subtracted from the received signal $r_k$ 914 in order to apply the DFE corrections. Other embodiments may choose to incorporate the negative assignment at the summer 916 into the determination of the DFE output signal $z_k$ 926. The DFE corrected signal $y_k$ 918 is sent to the slicer 920 that quantifies the signal into slicer decisions $\hat{a}_k$ 922. For an embodiment that does not include the adaptive feedback equalizer, implemented using the DFE filter 924 in FIG. 9, the quantifier input signal 918 is the received signal $r_k$ 914. An embodiment without the DFE filter 924 also does not require the summer 916. A system that does not include an adaptive feedback equalizer (i.e., DFE filter 924) is also described in the disclosure with respect to FIG. 8 above. The quantifier 920 makes a decision $\hat{a}_k$ 922 based on the value of the DFE corrected signal $y_k$ 918 (aka. the quantifier input signal 918). For an embodiment using a binary digital format and a slicer for the quantifier 920, the slicer/quantifier 920 assigns one of two voltage values representing one of two digital states (e.g. "on"/"1" or "off"/"0") to each decision $â_k$ 922. The slicer/quantifier 920 decides which of the two digital states to select by comparing the DFE corrected signal $y_k$ 918 to a threshold value and if the DFE corrected signal $y_k$ 918 voltage is above the threshold value, then the slicer/quantifier 920 assigns a first digital value (e.g. "on"/ "1") to $â_k$ 922, and if the DFE corrected signal $y_k$ 918 is less than the threshold voltage, the slicer/quantifier 920 assigns a second digital value (e.g., "off"/"0") to $â_k$ 922. For other multi-state format digital systems with more than two states, the slicer/quantifier 920 quantifies the quantifier input signal 918 into one of the appropriate data values of the multiple digital data values based on the data value ranges assigned for the multi-state digital format.

The output $â_k$ 922 of the quantifier 920 is the output of the receiver 906 (i.e., the final received signal). For the embodiment shown in FIG. 9, the quantifier decision output $â_k$ 922 is also used as an input to the Decision Feedback Equalizer (DFE) 924 as well as to calculate the error signal $e_k$ 940. The quantifier decision output $â_k$ 922 provides an input to the DFE filter 924 that acts as the adaptive FeedBack (FB) equalizer 824 described in the disclosure with respect to FIG. 8. The DFE filter 924 may have multiple taps, with 1, 2, 4, 6 and 8 tap DFEs 924 being typical choices for the DFE filter 924. The DFE output signal $z_k$ 926 is fed back to the received signal $r_k$ 916 through summer 916 to create DFE corrected signal $y_k$ 918 as part of a FeedBack (FB) loop. For some embodiments, the voltage levels of the quantifier 920 output decisions $â_k$ 922 may differ from the voltage levels of the transmitted signals $a_k$ 908 to $y_k$ 916. To handle the differing voltages, the quantifier decision output $â_k$ 922 may also be sent to the multiplier 934 where the quantifier decision output $â_k$ 922 signal is multiplied times the target level/scale factor $h_0$ 936 to normalize/ scale the quantifier decision output $â_k$ 922 signal voltage levels with the DFE corrected signal $y_k$ 918 voltage levels. If the quantifier decision output $â_k$ 922 signal utilizes the same voltage levels as the signals $a_k$ 908 to $y_k$ 916, it may not be necessary to normalize/scale the quantifier output decision 922 using multiplier 934 and target level/scale factor $h_0$ 936 (i.e., scale factor of one-to-one). The normalized/scaled output 938 from the multiplier 934 is sent to summer 942, which calculates a difference between the scaled quantifier decision output $â_k$ 938 and the DFE corrected signal $y_k$ 918 that was the input to the quantifier 920. As indicated, the DFE corrected signal $y_k$ 918 is assigned a negative value in the summation 942 such that the DFE corrected signal $y_k$ 918 is subtracted from the normalized/scaled output value 938 of the quantifier decision output $â_k$ 922 in order to determine the error signal $e_k$ 940. Other embodiments may not include the adaptive Feed-Back equalizer 924 and simply process the received signal 914 without further signal filtering as the quantifier input signal 918. In a system without the adaptive FeedBack equalizer 924, the summer 916 is also not necessary.

For the embodiment shown in FIG. 9, the FIR filter 910 at the transmitter is implemented as a three tap FIR filter 910 with a tap for the precursor ($c_{-1}$), the main cursor ($c_0$), and the postcursor ($c_{+1}$). Other embodiments may include multiple precursor and/or postcursor taps. Other embodiments may also place the FIR filter taps at locations (i.e., fractional locations) other than at multiples of the time slice (i.e. the time unit UI). Embodiments that utilize fractional locations for FIR pre/post cursor taps may necessitate that the adaptation (i.e., update) equations be modified to handle the fractional FIR tap locations. The changes to the adaptation equations follow conventional mathematical conventions that may be performed by a person skilled in the art. Other embodiments may also place the FIR filter taps at whole multiples of a pulse interval other than at the single whole multiples (e.g., at whole multiples 2, 4, 6 . . . of the pulse interval/width). Embodiments that place FIR filter taps at whole multiples of a pulse interval/period (other than a whole interval of one pulse interval/period) may necessitate that the adaptation (i.e., update) equations be modified to handle the whole multiple FIR tap locations. As for fractional locations, the changes to the adaptation equations follow conventional mathematical conventions that may be performed by a person skilled in the art. While the FIR taps disclosed in the example embodiments have uniform spacing (i.e., one pulse interval/ period), the spacing between FIR filter taps need not be uniform. For example, an embodiment may include pre/post filter taps at 2.5 time units (UI) in the precursor direction ($c_{-2.5}$), at 2 UI in the precursor direction ($c_{-2}$), at 1 UI in the precursor direction ($c_{-1}$), at 1.5 UI in the postcursor direction ($c_{+1}$), and at 3 UI in the postcursor direction ($c_{+3}$). As for fractional pre/post cursor tap locations, embodiments that utilize non-uniform locations for FIR pre/post cursor taps may necessitate that the adaptation (i.e., update) equations be modified to handle the non-uniform FIR tap locations. The changes to the adaptation equations follow conventional mathematical conventions that may be performed by a person skilled in the art. Various embodiments may also have only pre or only post cursor taps.

As described above with respect to FIGS. 4A & B, 5A & B, 6, and 7, for the 3 tap embodiment described in the figures, the coefficient of the precursor tap ($c_{-1}$) controls FeedForward (FF) elimination of a precursor portion of ISI, the coefficient ($c_0$) of the main cursor tap controls the gain/attenuation of the main/primary signal, and the coefficient of the postcursor tap ($c_{+1}$) controls FeedForward (FF) elimination of a postcursor portion of ISI. To filter the Inter-Symbol Interference (ISI), the main cursor tap of the FIR filter 910 may be set to a fixed value with only the precursor and postcursor taps available for updates. However, it is unusual not to include the main cursor tap since it may be desirable to adjust the gain/attenuation of the main/primary signal due to other channel impairments not associated with ISI such as a basic loss of signal strength.

In a real world application the pulse response $p_k$ of the channel 904 may change significantly during system 900 operation. To adapt to the changes in the pulse response $p_k$ of the channel 904, it may be desirable to adapt the precursor ($c_{-j}$) and postcursor coefficients ($c_{+j}$) of the FIR filter in response to changes in the pulse response $p_k$ of the channel 804. A FIR coefficient update calculation system/sub-system 928 calculates the updates 930 to the FIR precursor ($c_{-j}$) and postcursor ($c_{+j}$) coefficients and sends the coefficient updates 930 over the back-channel 932 to the FIR filter 910 at the transmitter 902. The FIR coefficient updates 930 may be made up of an exact value for the FIR coefficients or something as simple as increase or decrease each FIR tap coefficient. Since a simple increase/decrease command may be represented by a single "flag" bit (e.g., a "1" meaning increase and a "0" meaning decrease, or vice versa), it would require significantly less bandwidth on the back-channel 932 to send increase/decrease commands rather than a specific value or a specific amount to change a value for each FIR coefficient. When an increase command is sent by the flag bit(s), the system may increase the coefficient value by a predetermined increase amount. Similarly, when a decrease command is sent by the flag bit(s), the system may decrease the coefficient value by a predetermined decrease amount In some embodiments the predetermined increase and decrease amounts may be equal, but equal increase and decrease amounts are not required. Another embodiment may choose to have a tri-state communication system where the three states are increase, decrease, or remain the same. The tri-state communication may be implemented by using two bits for communication and/or sending a single pulse/symbol with three defined voltage levels for the three possible states.

Utilizing a back-channel 932 to adapt the FIR coefficients to the pulse response $p_k$ of the forward channel 804 may be referred to as "back-channel adaptation" or "Transmitter (TX) back-channel adaptation." Back-channel adaptation has the benefit of permitting the FIR filter tap coefficients to be adapted to the changing real world pulse response $p_k$ of the forward channel 804. By applying optimum coefficient settings to the FIR filter 910, a communications system 900 may be able to eliminate ISI well and also the communication system 900 may apply only the necessary amount of pre/post cursor correction, which results in a larger steady state output swing. That is, optimum settings for the pre/post cursor FIR filter 910 coefficients may assist in avoiding lower steady state voltage conditions, particularly when transmitting large set of equal data values (i.e., a long set of "1" or "0" data values).

Some type of transmitter back-channel adaptation has been made mandatory for implementation of an Institute of Electrical and Electronic Engineers (IEEE) 802.3ap compliant communication system. Further information on the IEEE 802.3ap standard documentation may be obtained by calling IEEE customer service at +1-732-981-0060 or contacting the IEEE Operations Center located at 445 Hoes Lane, Piscataway, N.J. 0854-4141,USA. An implementation of a back-channel adaptation system may utilize a single term of the communication signal $a_k$ 908 and the error signal $e_k$ 940 to calculate updates to the FIR filter 910 pre ($c_{-j}$) and post ($c_{+j}$) cursor tap coefficients. Various embodiments may utilize multiple terms of the slicer decisions $\hat{a}_k$ 922 and the error signal $e_k$ 940 to calculate updates to the FIR filter 910 pre ($c_{-j}$) and post ($c_{+j}$) cursor tap coefficients that produce more optimal settings than the single term $a_k$ 908 calculation. In the discussion of the single term and the multi-term FIR filter 910 tap coefficient update calculations to follow, the individual mathematical elements, components, or variables are defined as follows:

$a_k$: transmitted symbols (aka. bits or pulses) 908
k: index number of variable 908 as a function of pulses in time
$\hat{a}_k$: slicer 920 decisions 922
$r_k$: received signal 914
$y_k$: DFE corrected signal 918; includes both FIR 910 & DFE 924 correction
$p_k$: pulse response function of channel 804
$e_k$: error signal 940; difference between $y_k$ 918 & slicer decision $\hat{a}_k$ 922
$h_0$: target level/scale factor 936 of the communications signal $a_k$ 908
$c_j$: FIR filter 910 tap coefficient value for a particular FIR filter 910 tap j
j: FIR filter 910 tap coefficient index value;
    −1=precursor tap coefficient (e.g., −2, −3, −4,etc. may indicate multiple taps)
    0=main cursor tap coefficient
    +1=postcursor tap coefficient (e.g., 2, 3, 4,etc. may indicate multiple taps)
$c_{j,k}$: FIR filter 910 tap coefficient value at a particular time k
$s_k$: FIR filter output signal 912
$L_1$: number of precursor FIR taps
$L_2$: number of postcursor FIR taps
$d_i$: DFE 924 tap coefficient value for a particular DFE filter 924 tap i i: DFE 924 tap coefficient index value
M: number of DFE 924 taps
$z_k$: DFE output signal 926 used for FeedBack (FB) correction of $r_k$ 914
n: index of past and future pulses in calculation of $r_k$ 914 from the pulse function $p_k$
l: algebraic replacement for k-n (i.e., l=k-n, so n=k-l) in summation expression
w: weight value for generalized weighted linear combination equation
μ: step-size controlling speed & converged mean-square error of the adaptation algorithm
*: denotes convolution operation Eqs. 12-21 below represent the derivation of the FIR filter 910 tap coefficient update calculations based on a single term of the communication signal $a_k$ 908 and the error signal $e_k$ 940. In the derivation shown in Eqs. 12-21,it is assumed that the FIR filter 910 is placed at the receiver 906 instead of at the transmitter 902. This assumption is based on the understanding that the order of filters may be interchanged in a linear system without changing the overall transfer function of the system.

Error Signal 940 Calculation Equation:

$$e_k = \hat{a}_k h_0 - y_k \quad \text{Eq. 12:}$$

DFE Corrected Signal 918 Calculation Equation:

$$y_k = \sum_{j=-L_1}^{L_2} c_j r_{k-j} - \sum_{i=1}^{M} d_i \hat{a}_{k-i} \quad \text{Eq. 13}$$

For Eq. 13,the term summing $c_j r_{k-j}$ represents the received signal $r_k$ 914 filtered through the FIR filter 910 and the channel response $p_k$ 904, and the term summing $d_i \hat{a}_{k-i}$ represents the ISI canceling of the DFE filter output $z_k$ 926.

Convolution to Obtain a Value for the Received Signal $r_k$ 914:

$$r_k = a_k * p_k = \sum_n a_n p_{k-n} \quad \text{Eq. 14}$$

Thus, the Gradient is Represented by Eq. 15:

$$\frac{\partial e_k}{\partial c_j} = -r_{k-j} \quad \text{Eq. 15}$$

And, the sign-sign Least Mean Square (LMS):

$$c_{j,k} = c_{j,k-1} - \text{sign}(e_k)\text{sign}\left(\frac{\partial e_k}{\partial c_j}\right) \quad \text{Eq. 16}$$

Using the Relationship from Eq. 15,Eq. 16 Becomes:

$$c_{j,k} = c_{j,k-1} + \text{sign}(e_k)\text{sign}(r_{k-j}) \quad \text{Eq. 17:}$$

Approximating:

$$\text{sign}(r_{k-j}) \approx a_{k-j} \quad \text{Eq. 18:}$$

Using the Approximation of Eq. 18 Approximates the sign-sign Least Mean Square (LMS) Update Equation to:

$$c_{j,k} = c_{j,k-1} + \mu \text{sign}(e_k) a_{k-j} \quad \text{Eq. 19:}$$

Thus, the FIR Filter 910 Precursor (i.e., j=−1) Coefficient Calculation is:

$$c_{-1,k} = c_{-1,k-1} + \mu \text{sign}(e_k) a_{k+1} \quad \text{Eq. 20:}$$

And the FIR Filter 910 Postcursor (i.e., j=+1) Coefficient Calculation is:

$$c_{+1,k} = c_{+1,k-1} + \mu \text{sign}(e_k) a_{k-1} \quad \text{Eq. 21:}$$

Eqs. 20 & 21 represent the FIR filter 910 pre and post cursor tap coefficient determination equations utilized by a calculation that is a function of a single term of the communication signal $a_k$ 908 and the error signal $e_k$ 940. The value $\mu$ controls the speed and converced mean-square error for the adaptation algorithm. The calculations of Eqs. 20 & 21 are relatively easy to implement and work satisfactorily when the system is initialized correctly (i.e., the initial values chosen for the pre $c_{-1}$ and post $c_{+1}$ cursor tap coefficients are reasonably close to the ideal values). See FIGS. 10A-C for result data. However, the calculations of Eqs. 20 & 21 perform poorly when the initial pre $c_{-1}$ and post $c_{+1}$ cursor tap coefficients are larger than required (see FIGS. 10B&C). For Eqs. 20 & 21, coupling with the first DFE 924 tap may cause timing of the DFE corrected signal $y_k$ 918 to settle either at the left or right of the ideal sampling point. Further, using Eqs. 20 & 21 to calculate the FIR filter 910 tap coefficient updates may lead to sub-optimal equalization and/or divergence.

Figure 10A:
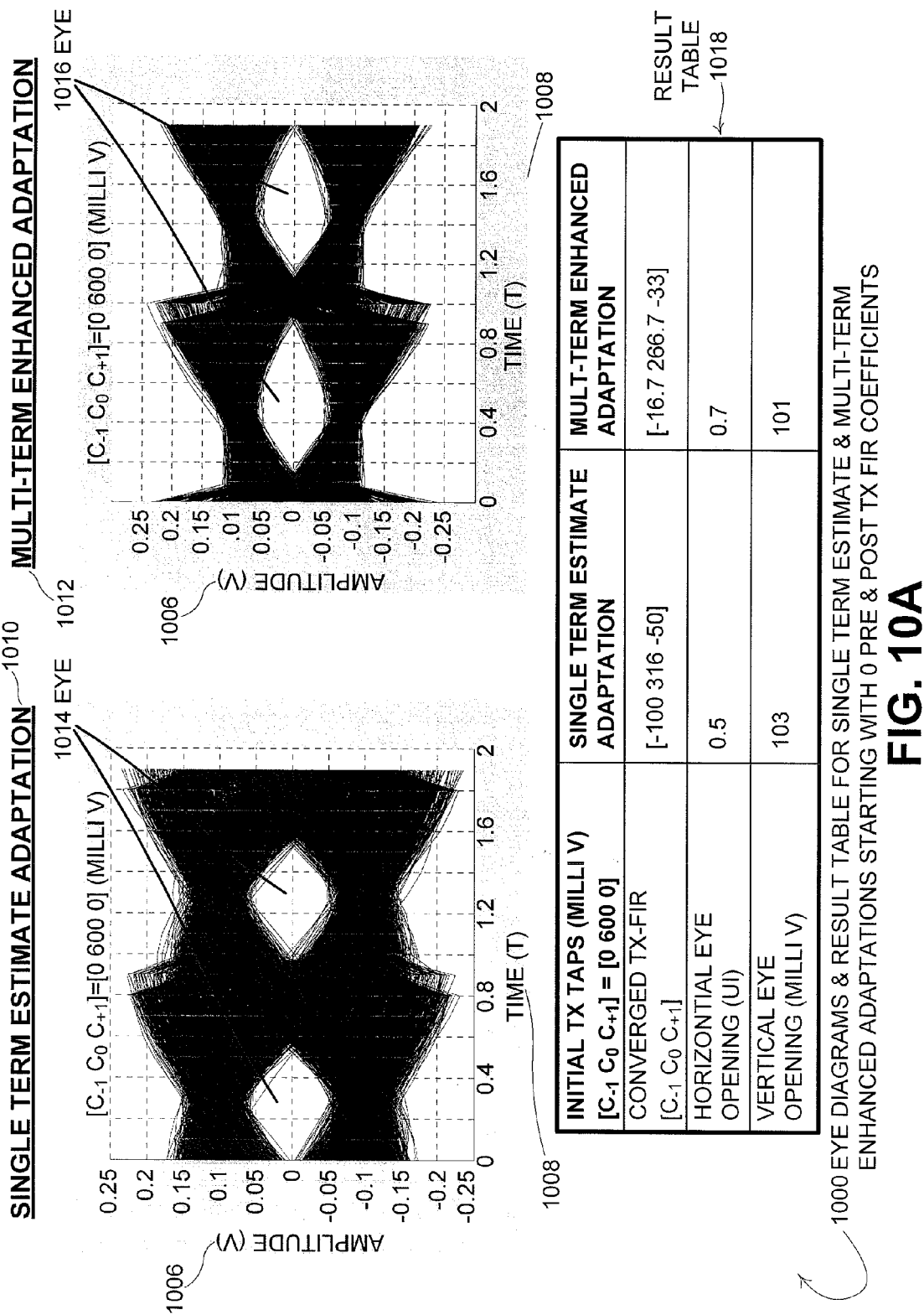
FIG. 10A is an illustration that shows eye diagrams and the associated result table for a single term estimate adaptation system and a multi-term enhanced adaptation embodiment starting with 0 pre and post transmitter FIR filter coefficients.
Figure 10B:
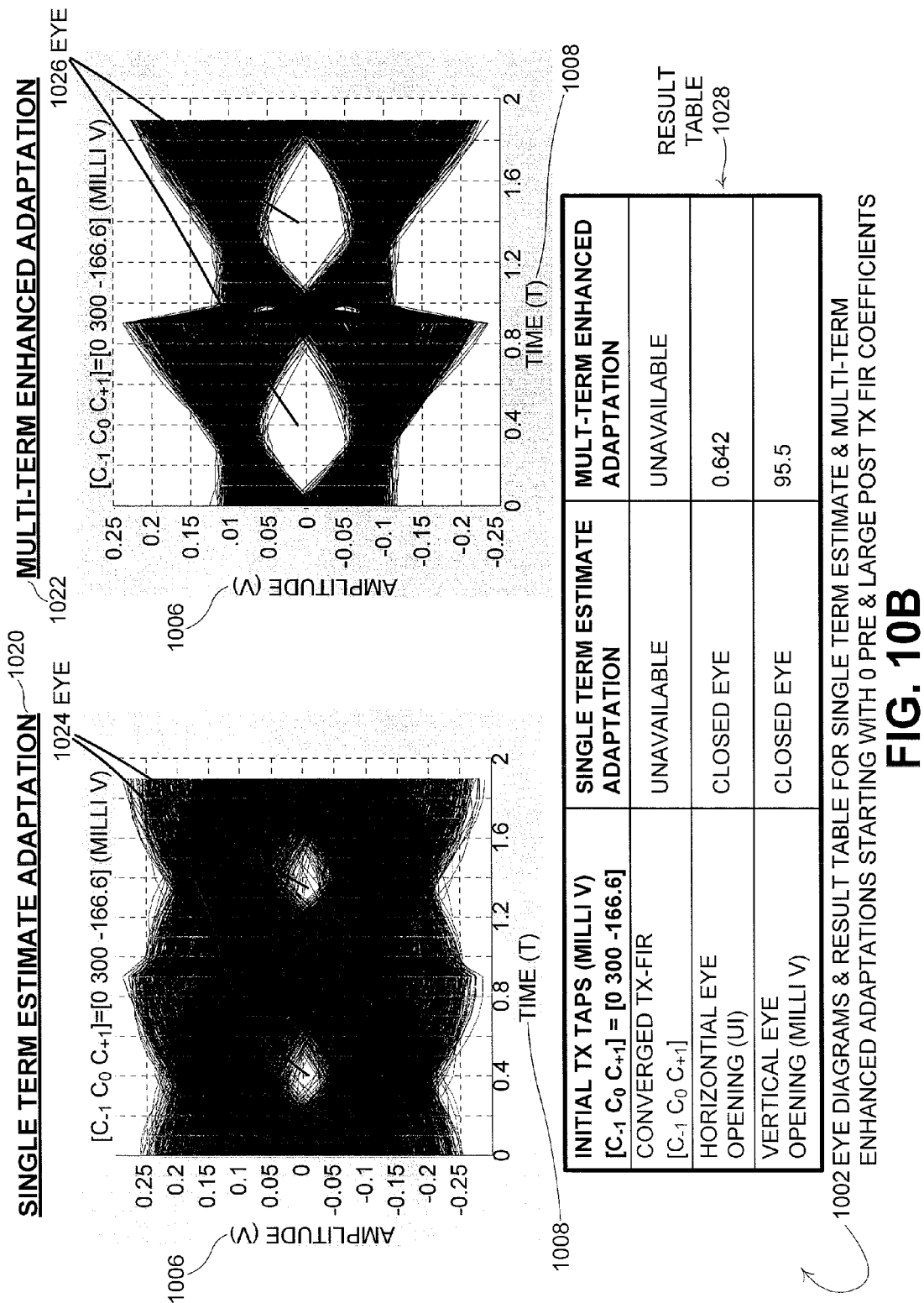
FIG. 10B is an illustration that shows eye diagrams and the associated result table for a single term estimate adaptation system and a multi-term enhanced adaptation embodiment starting with 0 pre and large post transmitter FIR filter coefficients.
Figure 10C:
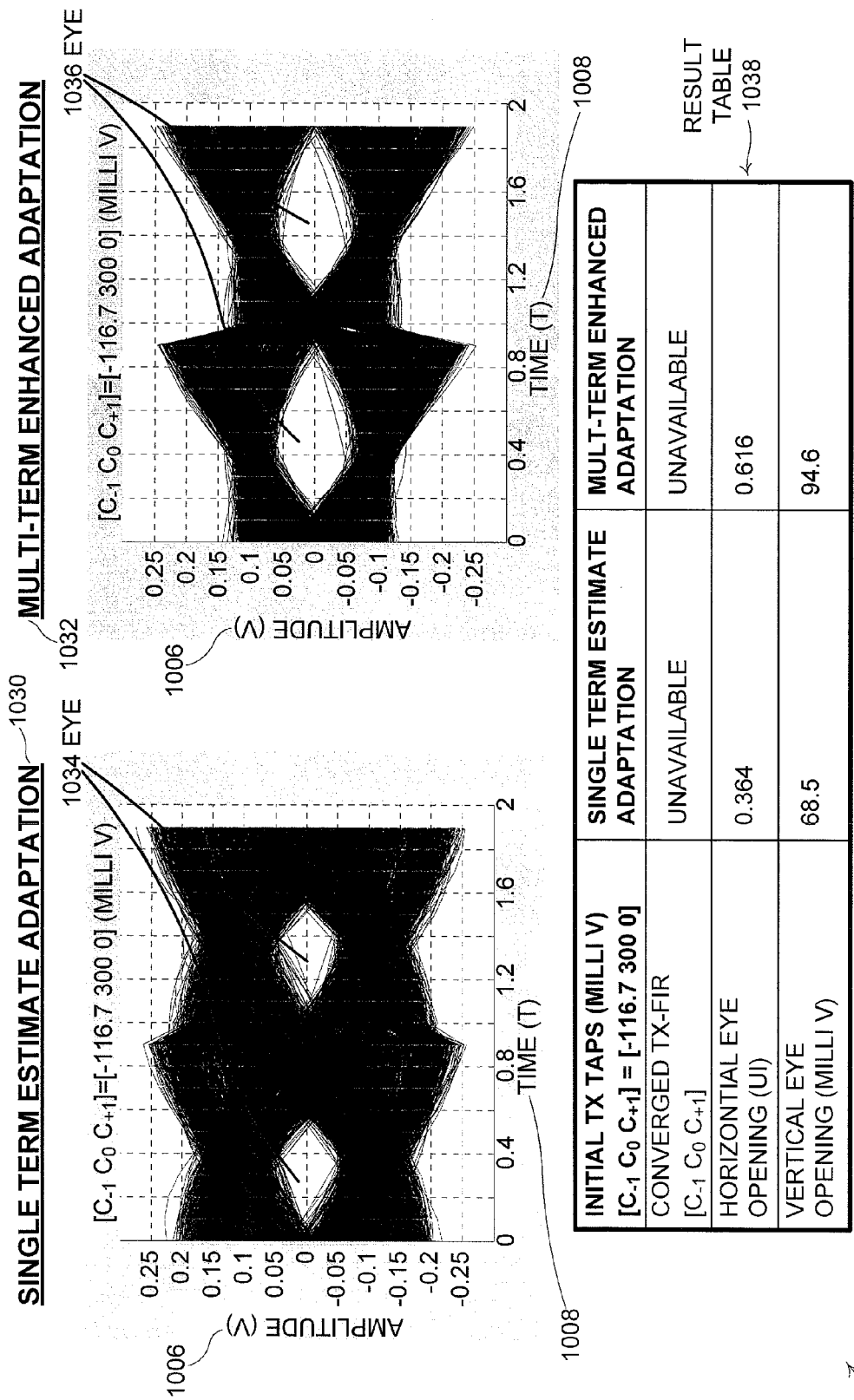
FIG. 10C is an illustration that shows eye diagrams and the associated result table for a single term estimate adaptation system and a multi-term enhanced adaptation embodiment starting with large pre and 0 post transmitter FIR filter coefficients.

Embodiments that utilize a function of multiple terms of the quantifier decisions $\hat{a}_k$ 922 in addition to the error signal $e_k$ 940 to calculate updates to the FIR filter 910 pre ($c_{-j}$) and post ($c_{+j}$) cursor tap coefficients show a significant performance improvement over the single term update Eqs. 20 & 21 (see results described in the disclosure with respect to FIGS. 10A-C). For Eqs. 22-32 below, the transmitter FIR filter 910 is assumed to be part of the transmitter 902. Thus, the derivation of the enhanced, multi-term FIR filter 910 tap coefficient adaption calculations is described in the disclosure with respect to Eqs. 22-32.

Error Signal 940 Calculation Equation:

$$e_k = \hat{a}_k h_0 - y_k \quad \text{Eq. 22:}$$

DFE Corrected Signal 918 Calculation Equation:

$$y_k = r_k - \sum_{i=1}^{M} d_i \hat{a}_{k-i} \quad \text{Eq. 23}$$

For Eq. 23, the term summing $d_i \hat{a}_{k-i}$ represents the ISI canceling of the DFE filter output $z_k$ 926.

Convolution to Obtain a Value for the Received Signal $r_k$ 914:

$$r_k = a_k * c_k * p_k = \sum_{j=L_1}^{L_2} c_j \sum_n a_{n-j} p_{k-n} \quad \text{Eq. 24}$$

For Eq. 24, the term summing $c_j$ represents the signal $a_k$ 908 already filtered 912 by the FIR filter 910 at the transmitter 902.

Thus, the Gradient is Represented by Eq. 25:

$$\frac{\partial e_k}{\partial c_j} = -\sum_n a_{n-j} p_{k-n} \quad \text{Eq. 25}$$

And:

$$c_{j,k} = c_{j,k-1} - \mu \text{sign}(e_k) \text{sign}\left(\frac{\partial e_k}{\partial c_j}\right) \quad \text{Eq. 26}$$

Using the Relationship from Eq. 25, Eq. 26 Becomes:

$$c_{j,k} = c_{j,k-1} + \mu \text{sign}(e_k) \text{sign}\left(\sum_n a_{n-j} p_{k-n}\right) \quad \text{Eq. 27}$$

Example Approximation to Compare to Single Term Calculation:

$$\frac{\partial e_k}{\partial c_j} = -\sum_n a_{n-j} p_{k-n} \approx -a_{k-j} \quad \text{Eq. 28}$$

Note that approximating the gradient of Eq. 25 with $-a_{k-j}$ gives the same sign-sign LMS update equation as given in Eq. 19 for the single term pre/post cursor coefficient calculation.

From Eq. 27, the Enhanced Update Equation May Be Written as:

$$\Delta c_{j,k} = \text{sign}(e_k) \text{sign}\left(\sum_n \hat{a}_{n-j} p_{k-n}\right) \quad \text{Eq. 29}$$

And rewriting Eq. 29 to set l equal to k−n:

$$\Delta c_{j,k} = \text{sign}(e_k) \text{sign}\left(\sum_n \hat{a}_{n-j} p_{k-n}\right) = \text{sign}(e_k) \text{sign}\left(\sum_l \hat{a}_{k-l-j} p_l\right) \quad \text{Eq. 30}$$

Approximating Eq. 30 to Remove the Unknown $p_l$ Gives:

$$\Delta c_{j,k} = \text{sign}(e_k) \text{sign}\left(\sum_l \hat{a}_{k-l-j}\right) \quad \text{Eq. 31}$$

Thus, a FIR Filter 910 Precursor (i.e., j=−1) Coefficient Update Calculation for the embodiment shown in FIG. 9 may be:

$$\Delta c_{-1,k} = \text{sign}(e_k) \text{sign}\left(\sum_l \hat{a}_{k-l+1}\right) \quad \text{Eq. 32}$$

And a FIR Filter 910 Postcursor (i.e., j=+1) Coefficient Update Calculation for the embodiment shown in FIG. 9 may be:

$$\Delta c_{+1,k} = \text{sign}(e_k) \text{sign}\left(\sum_l \hat{a}_{k-l-1}\right) \quad \text{Eq. 33}$$

Thus, for embodiments using multiple terms of the slicer decision Various embodiments may utilize multiple terms of the slicer decisions $\hat{a}_k$ 922, and the error signal $e_k$ 940 to calculate updates to the FIR filter 910 pre ($c_{-j}$) and post ($c_{+j}$) cursor tap coefficients. The embodiment shown in FIG. 9 may have the calculation at 928 perform Eq. 32 for the precursor ($c_{-1}$) tap coefficient update and Eq. 33 for the postcursor ($c_{+1}$) tap coefficient update.

The quantifier decisions 922 in the summation may be weighted to achieve a more reliable coefficient update result. For instance, the quantifier decisions 922 may be weighted to increase the effect of quantifier decisions closer to the current quantifier decision as the closest quantifier decisions may have a larger effect on the communications signal. With weighting, the update calculation may be generalized as the linear combination equation in Eq. 34 below.

$$\Delta c_{j,k} = \text{sign}(e_k)\text{sign}\left(\sum_l w_l \hat{a}_{k-l-j}\right) \quad \text{Eq. 34}$$

Benefits of a multi-term update calculation have been observed by using as few as two $\hat{a}_k$ 922 terms. Via experimentation, a good trade-off between the computational power required for the coefficient update calculation at 924 and the results of the coefficient update calculation is the use of six $\hat{a}_k$ 922 terms in the calculation by summing for l from −1 to 4 in the summation. Using l equal to −1 to 4 and generalizing using weighted decisions results in Eq. 35 and 36 for the precursor ($c_{-1}$) and postcursor ($c_{+1}$) coefficient update equations for the embodiment shown in FIG. 9.

Precursor (i.e., j=−1) Coefficient Update Calculation with l=−1 to 4:

$$\Delta c_{-1,k} = \text{sign}(e_k)\text{sign}(w_{-1}\hat{a}_{k+2} + w_0\hat{a}_{k+1} + w_1\hat{a}_k + w_2\hat{a}_{k-1} + w_3\hat{a}_{k-2} + w_4\hat{a}_{k-3}) \quad \text{Eq. 35:}$$

Postcursor (i.e., j=+1) Coefficient Update Calculation with l=−1 to 4:

$$\Delta c_{+1,k} = \text{sign}(e_k)\text{sign}(w_{-1}\hat{a}_k + w_0\hat{a}_{k-1} + w_1\hat{a}_{k-2} + w_2\hat{a}_{k-3} + w_3\hat{a}_{k-4} + w_4\hat{a}_{k-5}) \quad \text{Eq. 36:}$$

Given the tradeoffs between accuracy and computation power, via experimentation, it appears that the effective range of the summation of $a_{k-l-j}$ on the tested system may be summed for l over a range starting at a minimum of −5 to a maximum of 20, resulting in the inclusion of up to twenty-six $\hat{a}_k$ 922 terms. While the multi-term calculations of Eqs. 31 or 34 are more complicated than the single term calculations of Eqs. 20 and 21, the sign-sign LMS calculation of Eqs. 31 or 34 may be implemented without using much processing overhead. Unlike the single term update calculations of Eqs. 20 & 21, the multi-term update calculations of Eqs. 31 or 34 are insensitive to the initial values of the transmitter FIR filter 910 tap coefficient values, which results in better convergence. Thus, the multi-term calculations of Eqs. 31 or 34 may be said to be robust for different initial settings of the transmitter 902 FIR filter 910 when the single term Eqs. 20 & 21 are not robust. Further, the multi-term calculations of Eqs. 31 or 34 reduce the coupling between the post-cursor tap ($c_{+1}$) of the FIR filter 910 and the first tap of the DFE 924. As may be seen in the "eye" diagrams of FIGS. 10A-C, the multi-term FIR filter 910 update calculations (i.e., Eqs. 31 or 34) perform better than the single term coefficient calculations (i.e. Eqs. 20 & 21) in terms of "eye" opening at the quantifier output 918 after the transmitter 902 FIR filter 910 converges. Various embodiments may implement the update calculations using other adaptation algorithms than the linear combination sign-sign LMS equations described above that still utilize the conceptual underpinning of incorporating a function of multiple quantifier decisions 922 in the adaptation algorithm similar to the linear combination sign-sign LMS equations disclosed in detail above. Embodiments that utilize different update equations than the linear combination sign-sign LMS equations may necessitate that the adaptation (i.e., update) equations be modified to handle the change in the base adaptation equation. The changes required for the use of different based adaptation algorithms follow conventional mathematical conventions that may be performed by a person skilled in the art.

The main cursor coefficient ($c_0$) of the FIR filter 910 controls the amplitude of the primary signal $a_k$ 908 delivered to the receiver 906. A Variable Gain Amplifier (VGA) may be used to boost the received signal $r_k$ 914. The VGA may be used as an indicator of how to adjust the transmit signal amplitude (i.e., adjust the main cursor $c_0$ coefficient value). If the VGA gain is high, the signal is being boosted to bring the signal into a desired amplitude range, which indicates that the received signal $r_k$ 914 is weak. The VGA gain may be considered high when the VGA gain has a positive dB value. If the VGA gain is low, the signal is being attenuated (i.e., the amplitude is being reduced) to bring the signal into the desired amplitude range, which indicates that the received signal $r_k$ 914 is strong. The VGA gain may be considered low when the VGA gain has a negative dB value. A high dB threshold may be indicated by variable $V_1$ and a low dB threshold may be indicated by variable $V_2$. Adjusting the main cursor tap coefficient of the transmitter 902 FIR filter may be accomplished by sending a signal 930 over the back-channel 932 to the FIR filter 910 to increment $c_0$ if the VGA gain is greater than or equal to $V_1$, or sending a signal over the back-channel 932 to decrement $c_0$ if the VGA gain is less than $V_2$. While it may not be necessary to update the main signal gain for the ISI canceling aspects of the pre ($c_{-j}$) and post ($c_{+j}$) coefficients to suitably eliminate ISI, properly adjusting the main cursor $c_0$ assists with properly aligning the received signal $r_k$ 914 amplitude for proper interpretation by the receiver 906. By using the VGA as an indicator on how to adjust the main cursor $c_0$ coefficient of the transmitter 902 FIR filter 910 the need for an adaption loop similar to that for the pre ($c_{-j}$) and post ($c_{+j}$) tap coefficients is eliminated. Thus, the use of the VGA saves computation power by not requiring the adaption loop for the main cursor ($c_0$) coefficient update. If desired, reducing the main cursor coefficient $c_0$ of the FIR filter 910 of the transmitter 902 may help save transmitter power at the expense of increasing power consumption at the VGA of the receiver 906. Reducing power at the transmitter may be useful for a battery powered device as the transmitter 902 power consumption may be reduced.

To determine the effectiveness of the single term versus multi-term FIR filter 910 tap coefficient update mechanisms, a system may be operated and an "eye" diagram of the DFE corrected signal/quantifier input signal $y_k$ 918 may be generated. The more pronounced the "eye" appears in the eye diagram, the more optimum are the settings for the FIR filter 910 tap coefficient values. FIGS. 10A-C show eye diagrams from a system that calculates a 3-tap FIR Filter pre ($c_{-1}$) and post ($c_{+1}$) cursor tap coefficient values using the single term Eqs. 20 & 21 versus an eye diagram for an embodiment that calculates the 3-tap FIR Filter pre ($c_{-1}$) and post ($c_{+1}$) cursor tap coefficient values using the multi-term Eqs. 32 & 33. The system utilized had a sample victim channel for the communications channel, a data rate of 10.3125 Gb/s, a 3-tap FIR filter, a maximum transmitter swing of 600 mVdpk or 1200 mVdpp, an 8-tap receiver DFE, an analog liner equalizer with a single zero, a baud rate timing loop, and 500,000 simulated bits.

FIG. 10A is an illustration 1000 that shows eye diagrams 1010, 1012 and the associated result table 1018 for a single term estimate adaptation system 1010 and a multi-term enhanced adaptation embodiment 1012 starting with 0 pre ($c_{-1}$) and post ($c_{+1}$) cursor transmitter FIR filter coefficients. The eye diagrams 1010, 1012 measure the amplitude in Volts 1006 against time 1008 of the DFE corrected received signal at the receiver. For FIG. 10A, the initial pre ($c_{-1}$) and post ($c_{+1}$) coefficients are set to 0. After operation of the system the pre ($c_{-1}$) and post ($c_{+1}$) coefficients are adapted as indicated in table 1018. The eye 1014 of the single term estimate adaptation 1010 is clearly visible. The eye 1016 of the multi-term enhanced adaptation 1012 is also clearly visible and appears to be more pronounced than the eye 1014 of the single term estimate adaptation eye diagram 1010. Table 1018 gives specific values for the final coefficient values and the measurements of the eye openings for the single term estimate adaptation eye diagram 1010 and the multi-term enhanced adaptation eye diagram 1012. From table 1018, the horizontal eye opening of the single term estimate adaptation 1010 is "0.5 UI" versus "0.7 UI" for the multi-term enhanced adaptation eye diagram 1012, which means the multi-term enhanced eye diagram 1012 has a roughly 30% greater horizontal eye opening than the single term estimate eye diagram 1010. From table 1018, the vertical eye opening of the single term estimate adaptation 1010 is "103 mV" versus "101 mV" for the multi-term enhanced adaptation eye diagram 1012, which means the multi-term enhanced eye diagram 1012 has a vertical eye opening that is nearly identical to the single term estimate eye diagram 1010. While both the single term estimate adaptation 1010 and the multi-term enhanced adaptation 1012 produce satisfactory results, the multi-term enhanced adaptation 1032 produced a better signal with a much better horizontal eye opening and nearly identical vertical eye openings.

FIG. 10B is an illustration 1002 that shows eye diagrams 1020, 1022 and the associated result table 1028 for a single term estimate adaptation system 1020 and a multi-term enhanced adaptation embodiment 1022 starting with 0 pre ($c_{-1}$) and large (absolute value) post ($c_{+1}$) cursor transmitter FIR filter coefficients. The eye diagrams 1020, 1022 measure the amplitude in Volts 1006 against time 1008 of the DFE corrected received signal at the receiver. For FIG. 10B, the initial pre ($c_{-1}$) coefficient is set to 0 and the initial post ($c_{+1}$) coefficient is set to −166.6. After operation of the system the pre ($c_{-1}$) and post ($c_{+1}$) coefficients are adapted as indicated in table 1028. The eye 1024 of the single term estimate adaptation 1020 is very difficult to discern. The eye 1026 of the multi-term enhanced adaptation 1022 is clearly visible when the eye 1024 of the single term adaptation eye diagram 1020 is not. Table 1028 gives specific values for the final cursor coefficient values and the measurements of the eye openings for the single term estimate adaptation eye diagram 1020 and the multi-term enhanced adaptation eye diagram 1022. From table 1028, the horizontal eye opening of the single term estimate adaptation 1020 is indicated as "closed eye" versus "0.642 UI" for the multi-term enhanced adaptation eye diagram 1022, which means the multi-term enhanced eye diagram 1022 has a significant, observable horizontal eye opening while the single term estimate eye diagram 1020 does not. From table 1028, the vertical eye opening of the single term estimate adaptation 1020 is indicated as "closed eye" versus "95.5 mV" for the multi-term enhanced adaptation eye diagram 1022, which means the multi-term enhanced eye diagram 1022 has a significant, observable vertical eye opening when the single term estimate eye diagram 1020 does not. While the single term estimate adaptation 1010 of FIG. 10A created a satisfactory result when the FIR filter pre/post tap coefficients started at 0, the single term estimate adaptation 1020 of FIG. 10B delivered an unacceptable "closed eye" eye diagram 1020 when the post cursor $c_{+1}$ coefficient initial value was large.

FIG. 10C is an illustration 1004 that shows eye diagrams 1030, 1032 and the associated result table 1038 for a single term estimate adaptation system 1030 and a multi-term enhanced adaptation embodiment 1032 starting with large pre ($c_{-1}$) and 0 post ($c_{+1}$) cursor transmitter FIR filter coefficients. The eye diagrams 1030, 1032 measure the amplitude in Volts 1006 against time 1008 of the DFE corrected received signal at the receiver. For FIG. 10C, the initial pre ($c_{-1}$) coefficient is set to −116.7 and the initial post ($c_{+1}$) coefficient is set to 0. After operation of the system the pre ($c_{-1}$) and post ($c_{+1}$) coefficients are adapted as indicated in table 1038. The eye 1034 of the single term estimate adaptation 1030 is noticeably smaller than the eye 1036 of the multi-term enhanced adaptation 1032. Table 1038 gives specific values for the final coefficient values and the measurements of the eye openings for the single term estimate adaptation eye diagram 1030 and the multi-term enhanced adaptation eye diagram 1032. From table 1038, the horizontal eye opening of the single term estimate adaptation 1010 is "0.364 UI" versus "0.616 UI" for the multi-term enhanced adaptation eye diagram 1012, which means the multi-term enhanced eye diagram 1032 has a roughly 40% greater horizontal eye opening than the single term estimate eye diagram 1030. From table 1038, the vertical eye opening of the single term estimate adaptation 1030 is "68.5 mV" versus "94.6 mV" for the multi-term enhanced adaptation eye diagram 1032, which means the multi-term enhanced eye diagram 1032 has a roughly 30% greater vertical eye opening than the single term estimate eye diagram 1030. While the single term estimate adaptation 1030 produced a usable eye diagram when the post cursor $c_{+1}$ initial value was large, the multi-term enhanced adaption 1032 produced a significantly better result in both the horizontal and vertical eye opening measurements shown in the result table 1038.

In looking at the three initial FIR filter pre/post cursor coefficient value scenarios described in the disclosure with respect to FIGS. 10A-C, it is apparent that the multi-term enhanced adaptation 1012, 1022, 1032 consistently eliminates ISI regardless of the initial FIR filter pre/post cursor coefficient values. From inspection of the result tables 1018, 1028, and 1030, the horizontal eye opening for the multi-term enhanced adaptation 1012, 1022, 1032 varied only slightly from "0.642 UI" to "0.7 UI" while the single term multi-term enhanced adaptation varied significantly from "closed eye" (i.e., 0 UI) to "0.5 UI." The vertical eye opening for the multi-term enhanced adaptation 1012, 1022, 1032 also varied only slightly from "94.6 mV" to "101 mV" while the single term multi-term enhanced adaptation varied significantly from "closed eye" (i.e., 0 mV) to "103 mV." Hence, the multi-term enhanced adaptation 1012, 1022, 1032 is relatively independent of the initial values chosen for the pre/post cursor coefficients of the FIR filter. Conversely, the single term estimate adaptation 1010, 1020, 1030 results varied widely from one set of initial values to another, indicating that the single term estimate adaptation 1010, 1020, 1030 was very inconsistent and is significantly dependent on the initial values of the FIR filter pre/post cursor coefficients. Since the single term estimate adaptation 1010, 1020, 1030 is dependent on proper selection of the initial values for the FIR filter pre/post cursor coefficients, the single term estimate adaptation 1010, 1020, 1030 requires a user to have some initial understanding of the pulse response function of the channel. The multi-term enhanced adaptation 1012, 1022, 1032 permits a user to select FIR filter pre/post cursor initial values from a much wider range of initial values, thus requiring little, if any, prior knowledge of the response function of the channel.

Figure 11:
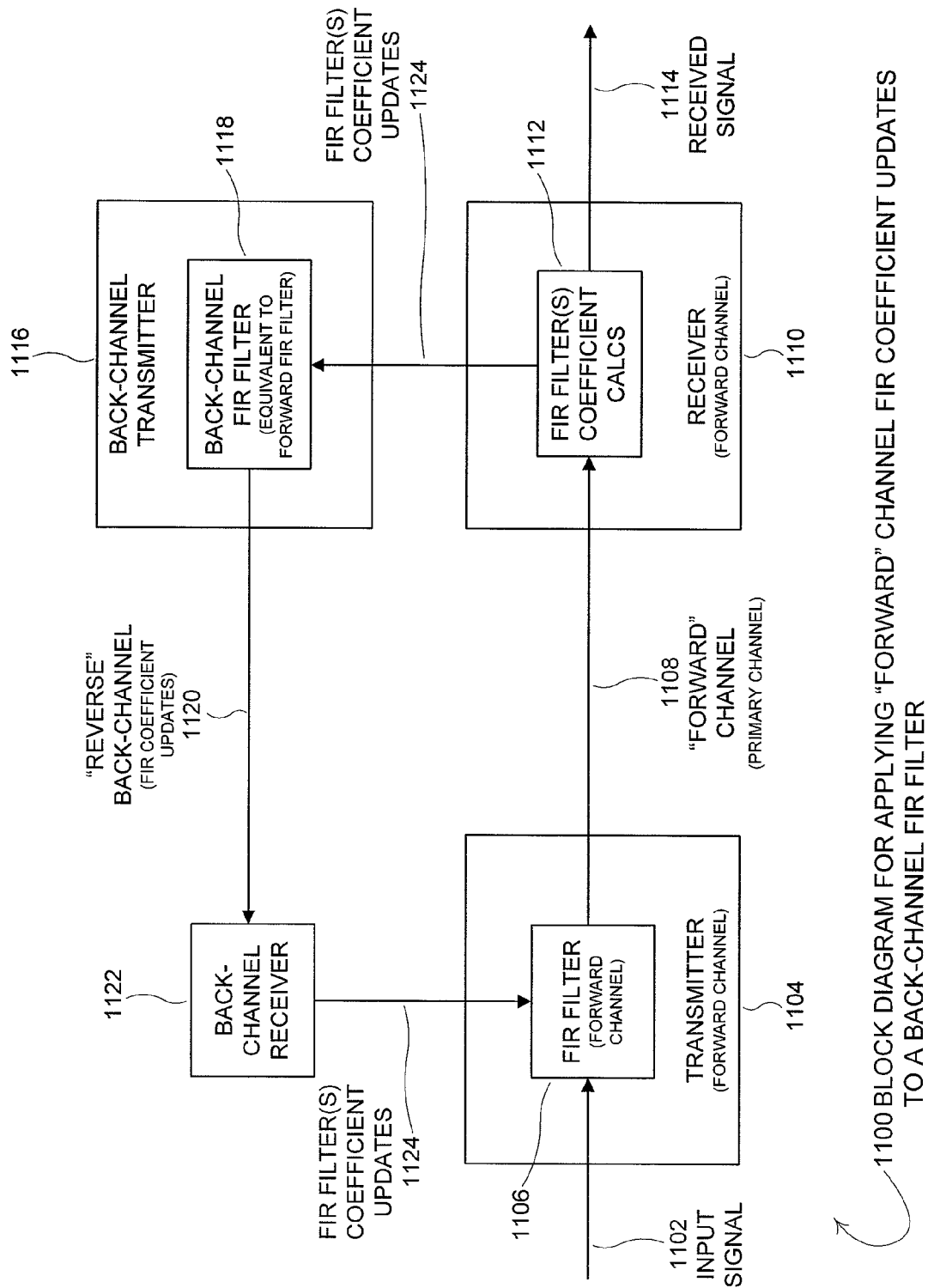
FIG. 11 is a block diagram that illustrates applying "forward" channel FIR filter coefficient updates to a back-channel FIR filter.

FIG. 11 is a block diagram 1100 that illustrates applying "forward" channel FIR filter coefficient updates 1124 to a back-channel FIR filter 1118. The back-channel 1120 may be thought of as a "reverse" communications channel 1120 for sending the FIR filter coefficient updates 1124 back to the FIR filter 1106 for the "forward" channel 1108. In a system where the "reverse" back-channel 1120 is symmetric with the "forward" (i.e., primary) channel 1108, a FIR filter applied to the back-channel 1120 (i.e., a back-channel FIR filter 1118) may utilize the FIR filter coefficient updates 1124 calculated for the "forward" channel FIR filter 1106. Symmetric channels are channels that have similar electrical characteristics with each other. The forward 1108 and back/reverse 1120 channels are likely to be symmetric when the back-channel 1120 uses a portion of the bandwidth of the "forward" channel 1108 such that the back-channel 1120 is transmitted on the same physical medium as the "forward" channel 1108. Hence, a back-channel 1120 that is symmetric with the "forward" channel 1108 has a back-channel pulse response that is substantially the same as the pulse response for the "forward" channel 1108. Thus, if the back-channel FIR filter 1118 has the same tap structure as the "forward" channel FIR filter 1106 (i.e., the same number of taps at the same relative pulse interval locations), then the pre/post cursor tap coefficients for the back-channel FIR filter 1118 may be "equivalently" updated with the same pre/post cursor tap coefficient updates as calculated for the "forward" channel FIR filter 1106 for an embodiment.

As illustrated in the block diagram 1100 of FIG. 11, a system with a symmetric back-channel 1120 may operate by having an input signal 1102 accepted by a "forward" channel transmitter 1104 and filtered by the "forward" channel FIR filter 1106. The filtered signal is then transmitted over the "forward" channel 1108 to the "forward" channel receiver 1110. The "forward" channel receiver 1110 calculates the "forward" channel FIR filter coefficients 1112 according to the adaptation algorithms of an embodiment and sends the received signal 1114 to users/devices that intend to perform operations with/on the received signal 1114. The FIR filter coefficient updates 1124 resulting form the FIR filter coefficient calculations 1112 are sent back to the "forward" channel FIR filter 1106 over the back-channel 1120. To send the FIR filter coefficient updates 1124 over the back-channel 1124, a back-channel transmitter 1116 needs to reside at the "forward" channel receiver 1110 side of the communications and a back-channel receiver 1122 needs to reside at the "forward" channel transmitter 1104 side of the communications. Typically, but not a requirement, the back-channel transmitter 1118 will be built into the same transceiver device as the "forward" channel receiver 1110, and the back-channel receiver 1122 will be built into the same transceiver device as the forward channel receiver 1104. With a symmetric back-channel 1120, and a back-channel FIR filter 1118 that has an equivalent tap structure as the "forward" channel FIR filter 1106, the back-channel FIR filter 1118 may utilize the FIR filter coefficient updates 1124 calculated 1112 for the "forward" channel FIR filter 1106 to eliminate ISI on the back-channel 1120. Thus, the FIR filter coefficient updates 1124 are passed to the back-channel transmitter 1116 where the FIR filter coefficient updates 1124 calculated 1112 by an embodiment are used to update the back-channel FIR filter 1118. The FIR filter coefficient updates 1124 are then sent on the "reverse" back-channel 1120 to the back channel receiver 1122 which receives the FIR filter coefficient updates 1124 and passes them to the "forward" channel transmitter 1104 to update the "forward" channel FIR filter 1106 to improve ISI elimination on the "forward" channel 1108.

The embodiments described are for a two state binary example embodiment that is often referred to as a Non-Return to Zero (NRZ) communications format. Various embodiments may be applied to other multi-state digital communications formats. For instance, an embodiment may be utilized for a four state Pulse Amplitude Modulation (PAM-4) as well as other multi-state digital communications formats with more than the two state binary digital communications described in the example embodiments described in this disclosure. The example embodiments show only a single precursor tap and a single postcursor tap for the FIR filter. Various embodiments may include multiple precursor and/or postcursor taps in the FIR filter with the coefficient updates being calculated as described for the single pre and post cursor taps except that the value of j (i.e., the FIR tap index number) is adjusted accordingly. As described for a single precursor tap and a single postcursor tap, the precursor taps control for elimination of precursor ISI and postcursor taps control for postcursor ISI. The example embodiments also assume that the FIR taps occur at a multiple of the time slice (i.e., time unit UI). Various embodiments may place the FIR taps at fractional time slice (i.e. UI) locations. Various embodiments may place the FIR pre/post filter taps at intervals with non-uniform spacing. Various embodiments may utilize a base adaptation algorithm that is different from the linear combination sign-sign LMS equation disclosed in detail but that still utilize multiple terms of the quantifier output in a similar fashion as described for the linear combination sign-sign LMS equations. When placing the pre/post cursor FIR taps at a fractional time slice, placing the pre/post cursor FIR taps at non-uniform intervals, and/or using different base adaptation algorithms, it may be necessary to adjust the disclosed equations to account for the changes. Adjustments to the equations are dependent on the exact changes made. However, the adjustments to the equations follow standard mathematical conventions and a person skilled in the art is capable of obtaining the adjustments to the equations using conventional mathematics. The example embodiments include a FeedBack DFE filter at the receiver. Various embodiments do not require the DFE filter and may remove the FeedBack DFE filter if desired.

Various embodiments may be applicable to various digital electronic communications methods and mediums. The embodiments described address using pulse modulation for transmitting the digital signal, but various embodiments may be applied to other digital modulation schemes by one familiar with the art. Other potential digital modulation schemes include, but are not limited to: frequency shift keying, phase shift keying, and quadrature amplitude modulation. The various digital modulation schemes may be transmitted on a wide variety of electronic communications mediums. Different electronic communications mediums may include, but are not limited to: both wired and wireless (e.g., radio or other electromagnetic radiation based communication), as well as light-based fiber optic communications, sonic communications or any other communications medium that may carry an electronic communications signal.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method to adapt coefficients of taps of a Finite Impulse Response (FIR) filter to increase elimination of interference from a digital communications signal comprising:
    transmitting said digital communications signal on a communications channel;
    eliminating at least a portion of interference introduced into said digital communications signal by passing said digital communications signal through said Finite Impulse Response (FIR) filter to create a FIR filtered signal, said FIR filter having at least one pre/post cursor tap that has a pre/post cursor tap coefficient;
    passing said FIR filtered signal over said communications channel causing said FIR filtered signal to be distorted by said interference to create a received signal that is passed to a quantifier as a quantifier input signal;
    quantifying said quantifier input signal with said quantifier into quantifier decisions;
    calculating an error signal by taking a difference between said quantifier decisions and said quantifier input signal;
    calculating a pre/post cursor tap coefficient adjustment value for said pre/post cursor tap coefficient of said at least one pre/post cursor tap as a function of said error signal and at least two of said quantifier decisions, said function including a linear combination function on said at least two of said quantifier decisions;
    sending said pre/post cursor tap coefficient adjustment value to said FIR filter;
    adjusting said pre/post cursor tap coefficient of said at least one pre/post cursor tap by said pre/post cursor tap coefficient adjustment value in order to adapt said FIR filter to increase elimination of said interference; and,
    receiving said digital communications signal as said quantifier decisions corresponding to said digital communications signal.

2. The method of claim 1 further comprising:
    summing said received signal with a DFE output signal from a Decision Feedback Equalizer (DFE) filter to create a DFE corrected signal that replaces said received signal as said quantifier input signal in said process of quantifying said quantifier input signal and said process of calculating said error signal; and,
    eliminating at least an additional portion of said interference introduced into said digital communications signal by said communications channel by sending said quantifier decisions to said DFE filter to create said DFE output signal used in said process for summing said received signal with said DFE output signal to create said DFE corrected signal, said DFE filter having at least one tap.

3. The method of claim 1 wherein said pre/post cursor tap coefficient adjustment value is sent to said FIR filter on a communications back-channel, said communications back-channel being symmetric with said communications channel, and further comprising:
    eliminating at least a portion of back-channel interference introduced into said communications back-channel by providing a back-channel FIR filter for eliminating said back-channel interference on said communications back-channel, said back-channel FIR filter having an equivalent pre/post tap coefficient structure as said FIR filter for eliminating said interference on said communications channel; and,
    adjusting back-channel pre/post cursor tap coefficients of said back-channel FIR filter equivalently as said pre/post cursor tap coefficient of said at least one pre/post cursor tap of said FIR filter for said communications channel is adjusted.

4. The method of claim 1 wherein said at least one pre/post cursor tap is placed at a location such that said location of said at least one pre/post cursor tap has location characteristics that are comprised of at least one of the group comprising: uniform spacing between each of said at least one pre/post cursor tap, non-uniform spacing between each of said at least one pre/post cursor tap, placement of said at least one pre/post cursor tap occurs at a fractional time interval of a pulse of said digital communications signal, placement of said at least one pre/post cursor tap occurs at a whole interval of said pulse of said digital communications signal, and placement of said at least one pre/post cursor tap occurs at a multiple whole interval of said pulse of said digital communications signal.

5. The method of claim 1 wherein said FIR filter further comprises a main cursor tap with a main cursor tap coefficient and said method of claim 1 further comprises:
    determining a main cursor tap coefficient adjustment value using a Variable Gain Amplifier (VGA) operating on said slicer input signal; and,
    adjusting said main cursor tap coefficient by said main cursor tap coefficient adjustment value such that said digital communications signal is boosted and attenuated as necessary to keep signal strength of said digital communication signal within a desired range.

6. The method of claim 1 wherein said pre/post cursor tap coefficient adjustment value is a flag value that indicates whether to increase, decrease, or leave unchanged said pre/post cursor tap coefficient such that said increase results in an increase of a predetermined increase amount and said decrease results in a decrease of a predetermined decrease amount.

7. An electronic communications system that adapts coefficients of taps of a Finite Impulse Response (FIR) filter to increase elimination of interference from a digital communications signal comprising:
    a communications channel;
    a transmitter that transmits said digital communications signal on said communications channel;
    said Finite Impulse Response (FIR) that eliminates at least a portion of said interference introduced into said digital communications signal by passing said digital communications signal through said FIR filter to create a FIR filtered signal, said FIR filtered signal being passed over said communications channel to create a received signal that is passed to a quantifier as a quantifier input signal, said FIR filter having at least one pre/post cursor tap that has a pre/post cursor tap coefficient that adjusts an effect of said at least one pre/post cursor tap on said FIR filtered signal;
    said quantifier that quantifies said quantifier input signal into quantifier decisions;
    an error summer that calculates an error signal by taking a difference between said quantifier decisions and said quantifier input signal;

a pre/post cursor tap coefficient adjustment value subsystem that calculates a pre/post cursor tap coefficient adjustment value for said pre/post cursor tap coefficient of said at least one pre/post cursor tap as a function of said error signal and at least two of said quantifier decisions, said function including a linear combination function on said at least two of said quantifier decisions;

a feedback transmission system that sends said pre/post cursor tap coefficient adjustment value to said FIR filter;

a pre/post cursor tap coefficient adjustment subsystem that adjusts said pre/post cursor tap coefficient of said at least one pre/post cursor tap by said pre/post cursor tap coefficient adjustment value in order to adapt said FIR filter to increase elimination of said interference; and, a receiver that receives said digital communications signal as said quantifier decisions corresponding to said digital communications signal.

8. The electronic communications system of claim 7 further comprising:

a received signal summer that sums said received signal with a DFE output signal from a Decision Feedback Equalizer (DFE) filter to create a DFE corrected signal that replaces said received signal as said quantifier input signal in said quantifier and in said error summer; and, said DFE filter that eliminates at least an additional portion of said interference introduced into said digital communications signal by said communications channel by sending said quantifier decisions to said DFE filter to create said DFE output signal used by said received signal summer to sum said received signal with said DFE output signal to create said DFE corrected signal, said DFE filter having at least one tap.

9. The electronic communications system of claim 7, further comprising:

a communications back-channel that carries said pre/post cursor adjustment value sent back to said FIR filter, said communications back-channel being symmetric with said communications channel;

a back-channel FIR filter that eliminates at least a portion of back-channel interference introduced into said communications back-channel, said back-channel FIR filter having an equivalent pre/post tap coefficient structure as said FIR filter that eliminates said interference on said communications channel; and, a back-channel pre/post cursor tap coefficient adjustment subsystem that adjusts back-channel pre/post cursor tap coefficients of said back-channel FIR filter equivalently as said pre/post cursor tap coefficient of said at least one pre/post cursor tap of said FIR filter for said communications channel is adjusted.

10. The electronic communications system of claim 7 wherein said at least one pre/post cursor tap is placed at a location such that said location of said at least one pre/post cursor tap has location characteristics that are comprised of at least one of the group comprising: uniform spacing between each of said at least one pre/post cursor tap, non-uniform spacing between each of said at least one pre/post cursor tap, placement of said at least one pre/post cursor tap occurs at a fractional time interval of a pulse of said digital communications signal, placement of said at least one pre/post cursor tap occurs at a whole interval of said pulse of said digital communications signal, and placement of said at least one pre/post cursor tap occurs at a multiple whole interval of said pulse of said digital communications signal.

11. The electronic communications system of claim 7 wherein said FIR filter further comprises a main cursor tap with a main cursor tap coefficient and said electronic communications system of claim 10 further comprises:

a Variable Gain Amplifier (VGA) operating on said slicer input signal that determines said main cursor adjustment value; and, a main cursor tap adjustment subsystem that adjusts said main cursor tap coefficient by a main cursor tap coefficient adjustment value such that said digital communications signal is boosted and attenuated as necessary to keep signal strength of said digital communication signal within a specified range.

12. The electronic communications system of claim 7 wherein said pre/post cursor tap coefficient adjustment value is a flag value that indicates whether to increase, decrease, or leave unchanged said pre/post cursor tap coefficient such that said increase results in an increase of a predetermined increase amount and said decrease results in a decrease of a predetermined decrease amount.

13. A method to adapt coefficients of taps of a Finite Impulse Response (FIR) filter to increase elimination of interference from a digital communications signal comprising:

transmitting said digital communications signal on a communications channel;

eliminating at least a portion of interference introduced into said digital communications signal by passing said digital communications signal through said Finite Impulse Response (FIR) filter to create a FIR filtered signal, said FIR filter having at least one pre/post cursor tap that has a pre/post cursor tap coefficient, said at least one pre/post cursor tap being placed at a location such that said location of said at least one pre/post cursor tap has location characteristics that are comprised of at least one of the group comprising: uniform spacing between each of said at least one pre/post cursor tap, non-uniform spacing between each of said at least one pre/post cursor tap, placement of said at least one pre/post cursor tap occurs at a fractional time interval of a pulse of said digital communications signal, placement of said at least one pre/post cursor tap occurs at a whole interval of said pulse of said digital communications signal, and placement of said at least one pre/post cursor tap occurs at a multiple whole interval of said pulse of said digital communications signal;

passing said FIR filtered signal over said communications channel causing said FIR filtered signal to be distorted by said interference to create a received signal that is passed to a quantifier as a quantifier input signal;

quantifying said quantifier input signal with said quantifier into quantifier decisions;

calculating scaled quantifier decisions by multiplying each of said quantifier decisions by a scale factor;

calculating an error signal by taking a difference between said scaled quantifier decisions and said quantifier input signal;

calculating a pre/post cursor tap coefficient adjustment value for said pre/post cursor tap coefficient of said at least one pre/post cursor tap as a function of said error signal and at least two of said quantifier decisions;

sending said pre/post cursor tap coefficient adjustment value to said FIR filter;

adjusting said pre/post cursor tap coefficient of said at least one pre/post cursor tap by said pre/post cursor tap coefficient adjustment value in order to adapt said FIR filter to increase elimination of said interference; and, receiving said digital communications signal as said quantifier decisions corresponding to said digital communications signal.

14. The method of claim 13 further comprising:
- summing said received signal with a DFE output signal from a Decision Feedback Equalizer (DFE) filter to create a DFE corrected signal that replaces said received signal as said quantifier input signal in said process of quantifying said quantifier input signal and said process of calculating said error signal; and,
- eliminating at least an additional portion of said interference introduced into said digital communications signal by said communications channel by sending said quantifier decisions to said DFE filter to create said DFE output signal used in said process for summing said received signal with said DFE output signal to create said DFE corrected signal, said DFE filter having at least one tap.

15. The method of claim 13 wherein said pre/post cursor tap coefficient adjustment value is sent to said FIR filter on a communications back-channel, said communications back-channel being symmetric with said communications channel, and further comprising:
- eliminating at least a portion of back-channel interference introduced into said communications back-channel by providing a back-channel FIR filter for eliminating said back-channel interference on said communications back-channel, said back-channel FIR filter having an equivalent pre/post tap coefficient structure as said FIR filter for eliminating said interference on said communications channel; and,
- adjusting back-channel pre/post cursor tap coefficients of said back-channel FIR filter equivalently as said pre/post cursor tap coefficient of said at least one pre/post cursor tap of said FIR filter for said communications channel is adjusted.

16. The method of claim 13 wherein said FIR filter further comprises a main cursor tap with a main cursor tap coefficient and said method of claim 1 further comprises:
- determining a main cursor tap coefficient adjustment value using a Variable Gain Amplifier (VGA) operating on said slicer input signal; and,
- adjusting said main cursor tap coefficient by said main cursor tap coefficient adjustment value such that said digital communications signal is boosted and attenuated as necessary to keep signal strength of said digital communication signal within a desired range.

17. The method of claim 13 wherein said pre/post cursor tap coefficient adjustment value is a flag value that indicates whether to increase, decrease, or leave unchanged said pre/post cursor tap coefficient such that said increase results in an increase of a predetermined increase amount and said decrease results in a decrease of a predetermined decrease amount.

18. An electronic communications system that adapts coefficients of taps of a Finite Impulse Response (FIR) filter to increase elimination of interference from a digital communications signal comprising:
- a communications channel;
- a transmitter that transmits said digital communications signal on said communications channel;
- said Finite Impulse Response (FIR) that eliminates at least a portion of said interference introduced into said digital communications signal by passing said digital communications signal through said FIR filter to create a FIR filtered signal, said FIR filtered signal being passed over said communications channel to create a received signal that is passed to a quantifier as a quantifier input signal, said FIR filter having at least one pre/post cursor tap that has a pre/post cursor tap coefficient that adjusts an effect of said at least one pre/post cursor tap on said FIR filtered signal, said at least one pre/post cursor tap being placed at a location such that said location of said at least one pre/post cursor tap has location characteristics that are comprised of at least one of the group comprising: uniform spacing between each of said at least one pre/post cursor tap, non-uniform spacing between each of said at least one pre/post cursor tap, placement of said at least one pre/post cursor tap occurs at a fractional time interval of a pulse of said digital communications signal, placement of said at least one pre/post cursor tap occurs at a whole interval of said pulse of said digital communications signal, and placement of said at least one pre/post cursor tap occurs at a multiple whole interval of said pulse of said digital communications signal;
- said quantifier that quantifies said quantifier input signal into quantifier decisions;
- a scaling subsystem that calculates scaled quantifier decisions by multiplying each of said quantifier decisions by a scale factor;
- an error summer that calculates an error signal by taking a difference between said scaled quantifier decisions and said quantifier input signal;
- a pre/post cursor tap coefficient adjustment value subsystem that calculates a pre/post cursor tap coefficient adjustment value for said pre/post cursor tap coefficient of said at least one pre/post cursor tap as a function of said error signal and at least two of said quantifier decisions;
- a feedback transmission system that sends said pre/post cursor tap coefficient adjustment value to said FIR filter;
- a pre/post cursor tap coefficient adjustment subsystem that adjusts said pre/post cursor tap coefficient of said at least one pre/post cursor tap by said pre/post cursor tap coefficient adjustment value in order to adapt said FIR filter to increase elimination of said interference; and,
- a receiver that receives said digital communications signal as said quantifier decisions corresponding to said digital communications signal.

19. The electronic communications system of claim 18 further comprising:
- a received signal summer that sums said received signal with a DFE output signal from a Decision Feedback Equalizer (DFE) filter to create a DFE corrected signal that replaces said received signal as said quantifier input signal in said quantifier and in said error summer; and,
- said DFE filter that eliminates at least an additional portion of said interference introduced into said digital communications signal by said communications channel by sending said quantifier decisions to said DFE filter to create said DFE output signal used by said received signal summer to sum said received signal with said DFE output signal to create said DFE corrected signal, said DFE filter having at least one tap.

20. The electronic communications system of claim 18, further comprising:
- a communications back-channel that carries said pre/post cursor adjustment value sent back to said FIR filter, said communications back-channel being symmetric with said communications channel;
- a back-channel FIR filter that eliminates at least a portion of back-channel interference introduced into said communications back-channel, said back-channel FIR filter having an equivalent pre/post tap coefficient structure as said FIR filter that eliminates said interference on said communications channel; and, a back-channel pre/post cursor tap coefficient adjustment subsystem that adjusts back-channel pre/post cursor tap coefficients of said back-channel FIR filter equivalently as said pre/post cursor tap coefficient of said at least one pre/post cursor tap of said FIR filter for said communications channel is adjusted.

21. The electronic communications system of claim 18 wherein said FIR filter further comprises a main cursor tap with a main cursor tap coefficient and said electronic communications system of claim 10 further comprises:
   a Variable Gain Amplifier (VGA) operating on said slicer input signal that determines said main cursor adjustment value; and,
   a main cursor tap adjustment subsystem that adjusts said main cursor tap coefficient by a main cursor tap coefficient adjustment value such that said digital communications signal is boosted and attenuated as necessary to keep signal strength of said digital communication signal within a specified range.

22. The electronic communications system of claim 18 wherein said pre/post cursor tap coefficient adjustment value is a flag value that indicates whether to increase, decrease, or leave unchanged said pre/post cursor tap coefficient such that said increase results in an increase of a predetermined increase amount and said decrease results in a decrease of a predetermined decrease amount.

* * * * *